United States Patent [19]

Bergh et al.

[11] Patent Number: 4,773,759

[45] Date of Patent: Sep. 27, 1988

[54] INTERFEROMETER WITH KERR EFFECT COMPENSATION

[75] Inventors: Ralph A. Bergh, Menlo Park, Calif.; Brian Culshaw, Kilmacolm, Scotland; Herve C. Lefevre, Paris, France; Herbert J. Shaw, Stanford; C. Chapin Cutler, Palo Alto, both of Calif.

[73] Assignee: The Board of Trustees of the Leland Stanford Junior University, Stanford, Calif.

[21] Appl. No.: 49,805

[22] Filed: May 12, 1987

Related U.S. Application Data

[63] Continuation-in-part of Ser. No. 637,043, Jun. 19, 1984, abandoned, and a continuation-in-part of Ser. No. 574,002, Jan. 23, 1984, abandoned.

[51] Int. Cl.$^4$ .................. G01B 9/02; G01C 19/64
[52] U.S. Cl. ..................................................... 356/350
[58] Field of Search ........................................ 356/350

[56] References Cited

U.S. PATENT DOCUMENTS

| | | |
|---|---|---|
| 4,265,541 | 5/1981 | Leclerc et al. |
| 4,283,144 | 8/1981 | McLandrich |
| 4,299,490 | 11/1981 | Cahill et al. |
| 4,386,822 | 6/1983 | Bergh |
| 4,389,090 | 6/1983 | Lefevre |
| 4,410,275 | 10/1983 | Shaw et al. |
| 4,456,377 | 6/1984 | Shaw et al. |
| 4,529,312 | 7/1985 | Pavlath et al. |
| 4,529,313 | 7/1985 | Petermann et al. |
| 4,634,282 | 1/1987 | Shaw et al. |

OTHER PUBLICATIONS

Ezekiel et al., "Intensity Dependent Nonreciprocal . . . Gyroscope", Fiber Optic Rotation . . . Technologies, 1st Intl. Conf., MIT, Nov. 9-11, 1981.
Bergh et al., "An Overview of Fiber Optic Gyroscopes", J. of Lightwave Tech., vol. LT-2, No. 2, Apr. 1984, pp. 98-99.
Fredericks, "Scattering Matrix Analysis on the Use of a Wide-Band Laser . . . Rate Sensor", pp. 82-99.
Ulrich, "Low-Drift Fibre Gyro Using a Superluminescent Diode", Electronics Letters, vol. 17, No. 10, May 14, 1981, pp. 352-353.
Ulrich, "Fiber Optic Rotation Sensing with Low Drift", Optics Letters, vol. 5, May 1980, pp. 173-175.
Bergh, "All-single-mode fiber optic gyroscope", Optics Letters, vol. 6, No. 4, Apr. 1981.
Bergh et al., "All-single-mode fiber-optic gyroscope with long-term stability", Optics Letters, vol. 6, No. 10, Oct. 1981, pp. 502-504.
Lefevre et al., "All-fiber gyroscope with inertial-navigation short-term sensitivity", Optics Letters, vol. 7, No. 9, Sep. 1982, pp. 454-456.
"Sensitive fiber-optic gyroscopes", Physics Today, vol. 34, No. 10, Oct. 1981, pp. 20-22.
Bergh et al., "Single Mode Fiber Optic Directional Coupler", Electronics Letters, vol. 16, No. 7, Mar. 27, 1980, pp. 260-261.
Bergh et al., "Compensation of the optical Kerr effect in fiber-optic gyroscopes", Optics Letters, vol. 7, No. 6, Jun. 1982, pp. 282-284.

Primary Examiner—Vincent P. McGraw
Assistant Examiner—S. A. Turner
Attorney, Agent, or Firm—Knobbe, Martens, Olson & Bear

[57] ABSTRACT

A fiber optic interferometer provides Kerr effect compensation by intensity modulating counterpropagating waves of unequal intensity such that the average value of the square of the intensity is equal to a constant times the average value of the intensity squared, the constant preferably being equal to about two. The intensity modulation may be achieved by using a modulator in combination with a light source or by using a source in which plural frequencies combine to provide the modulation.

48 Claims, 7 Drawing Sheets

INTERFEROMETER WITH KERR EFFECT COMPENSATION

BACKGROUND OF THE INVENTION

This application is a continuation-in-part of U.S. patent application Ser. No. 574,002, filed Jan. 23, 1984 on International Application No. PCT/US82/00713, filed May 25, 1982, and is also a continuation-in-part of U.S. patent application Ser. No. 637,043, filed June 19, 1984 on International Application No. PCT/US82/01542, filed Nov. 1, 1982, both now abandoned.

The present invention relates to fiber optic interferometers, and particularly, to fiber optic ring interferometers for rotation sensing.

A fiber optic ring interferometer typically comprises a loop of fiber optic material to which lightwaves are coupled for propagation around the loop in opposite directions. After traversing the loop, the counterpropagating waves are combined so that they constructively or destructively interfere to form an optical output signal. The intensity of this optical output signal varies as a function of the type and amount of interference, which, in turn, is dependent upon the relative phases of the counterpropagating waves.

Ring interferometers have proven particularly useful for rotation sensing. Rotation of the loop creates a relative phase difference between the counterpropagating waves, in accordance with the well-known "Sagnac" effect, with the amount of phase difference corresponding to the velocity of rotation. The optical output signal produced by the interference of the counterpropagating waves, when recombined, varies in intensity as a function of the rotation rate of the loop. Rotation sensing is accomplished by detection of this optical output signal.

While mathematical calculations indicate that ring interferometers should be capable of providing rotation sensing accuracies substantially better than are required for inertial navigation (e.g., 0.001 degrees per hour or less), the results achieved in practice have generally not conformed to theoretical expectations. Some of the reasons for the disparity between theoretical and actual results have been identified as including spurious waves caused by Rayleigh backscattering, and non-rotationally-induced phase differences caused by residual fiber birefringence.

More recently, it was discovered that the accuracy of rotation sensing is also limited by the AC Kerr effect. The AC Kerr effect is a well-known optical effect in which the refractive index of a substance changes when the substance is placed in a varying electric field. In optical fibers, the electric fields of lightwaves propagating therethrough can themselves change the refractive index of the fiber, in accordance with the Kerr effect. The amount of change is proportional to the square of the electric field, or the light intensity. Since the propagation constant of the fiber, for each of the waves, is a function of refractive index, the Kerr effect manifests itself as intensity dependent perturbations of the propagation constants. Unless such perturbations happen to be exactly the same for each of the counterpropagating waves, the AC or optical Kerr effect will cause the waves to propagate with different velocities, resulting in a non-rotationally-induced phase difference between the waves, and thereby creating a spurious signal, which is indistinguishable from a rotationally induced signal. This spurious, Kerr-induced signal is a major source of long-term drift in current, state-of-the-art, fiber optic rotation sensing interferometers. Thus, there exists a need to reduce or eliminate the Kerr-induced phase difference in fiber optic interferometers, particularly in those requiring high sending accuracies, such as in inertial navigation grade rotation sensors.

SUMMARY OF THE INVENTION

The present invention comprises a fiber optic ring interferometer having Kerr effect compensation. The interferometer includes a light source and a loop of fiber optic material. A coupler is utilized to couple light from the source to the loop. The coupler splits the light from the source into first and second waves which counterpropagate through the loop. The coupler also combines the waves after propagation through the loop to form an output signal. The intensity of the counterpropagating waves is sufficiently high to cause the electric fields of the counterpropagating waves to alter the propagation constant of the fiber optic material in accordance with the Kerr effect to produce a self effect and a cross effect for each of the waves. The relative intensity of the waves is unequal, which causes the self effect and the cross effect of one wave to be different than the self effect and cross effect of the other wave. The light produced by the source is intensity modulated to cause the intensity of the counterpropagating waves to vary in accordance with a waveform selected to reduce Kerr-induced differences in the average propagation constants for the waves. The average value of the square of the waveform intensity is equal to a constant times the average value of the waveform intensity squared, the constant having a value between 1.6 and 2.4.

In one embodiment, the intensity of the waves is modulated in accordance with the selected waveform by a modulator. The waveform, for example, may comprise a square wave having a 50% duty cycle. In another embodiment, the intensity modulation is produced by a light source, such as a super luminescent diode, which provides light having a plurality of frequencies which combine to produce a light intensity which varies with time such that the average value of the square of the intensity is substantially equal to twice the average value of the intensity squared.

The invention also includes a method of operating a fiber optic ring interferometer in which a light source is optically coupled to apply counterpropagating lightwaves to the loop with sufficiently unequal intensity and sufficiently high combined intensity to alter the propagation constant of the fiber during counterpropagation of the lightwaves through the loop and thereby cause a Kerr-induced phase difference between the waves. At least one of the counterpropagating lightwaves applied to the loop is intensity modulated in accordance with a waveform which reduces the Kerr-induced phase difference and thereby provides Kerr effect compensation.

The invention further comprises a method of reducing errors caused by the AC Kerr effect in a fiber optic ring interferometer having a light source optically coupled to apply counterpropagating lightwaves of unequal intensity to a loop of optical fiber. The method comprises the steps of utilizing the light source to produce light having an intensity corresponding to a predetermined waveform and modifying the predetermined waveform to cause the intensity of the counterpropagating waves to correspond to a modified waveform which reduces the errors caused by the Kerr effect.

In accordance with another aspect of the invention, Kerr effect-induced errors in a fiber optic ring interferometer are reduced by selecting a light source having a sufficient number of frequencies to produce intensity modulated light in which the average value of the square of the intensity is substantially equal to twice the average value of the intensity squared so as to yield a duty cycle selected to compensate for the Kerr effect-induced errors. Light from the source is coupled into the interferometer such that two counterpropagating waves having unequal intensities travel therethrough. The waves are combined to produce an interference pattern and intensity variations in the interference pattern are detected.

It has been found that Kerr effect errors are reduced or eliminated by using a light source which provides an output comprising oscillatory modes having a number of different wavelengths to supply light to a gyroscope comprising a loop of single mode optical fiber. The Kerr effect errors are eliminated or substantially reduced if each of the counterpropagating waves has a 50% duty cycle. The different wavelengths beat with one another to cause intensity variations in the counterpropagating waves which results in a 50% duty cycle for each of the waves. If the counterpropagating waves originate from a multimode source, the nonreciprocal, intensity weighted average of the Kerr-induced phase shift accumulated by each wave during traverse of the interferometer loop will vary inversely as the number of modes. As used herein, the term multimode source refers to a light source which produces plural frequencies, as opposed to a single mode source which produces light at a substantially single frequency.

A single mode optical fiber has only one transverse power distribution in a predetermined wavelength range. However, a single mode fiber will simultaneously guide a number of wavelengths with all guided wavelengths having the same transverse power distribution, such as transverse electric, or TE, in which the electric field vector is perpendicular to the direction of propagation.

After traversing the loop, the oscillatory modes recombine in the coupler such that corresponding counterpropagating waves interfere with one another to produce an interference pattern from which the Sagnac phase shift may be measured.

In the event that a multimode source results in a duty cycle greater than 50%, a modulator may be used to modulate the multimode output to produce a light signal having a 50% duty cycle for input to the loop.

By compensating for the Kerr effect according to the present invention, a major source of sensing error is substantially reduced or eliminated. It is believed that Kerr effect compensation according to the invention is a major breakthrough for the development of inertial navigation grade fiber optic rotation sensors for use in gyroscopes.

BRIEF DESCRIPTION OF THE DRAWINGS

These and other advantages of the present invention are best understood through reference to the drawings, in which.

DETAILED DESCRIPTION OF THE PREFERRED EMBODIMENT

In addition to Kerr effect compensating means, the preferred embodiment of the present invention also includes a synchronous detection system for detecting the intensity of the optical output signal to indicate rotation rate, and a polarization controlling system to maintain the polarization of the light in the fiber loop. These systems are described in *Optics Letters*, Vol. 15, No. 11 (November 1980), pp. 488–490, in U.S. patent application Ser. Nos. 249,714 and 319,311, issued as U.S. Pat. Nos. 4,410,275 and 4,671,658, respectively, and in International Patent Application No. PCT/US82/00400, filed Mar. 31, 1982, which are hereby incorporated herein by reference. The polarization control and synchronous detection systems described therein are appropriate for use with the Kerr effect compensation of the present invention, and contribute to the overall performance of the rotation sensing interferometer described herein. The preferred embodiment will first be described in reference to these systems, and subsequently, a detailed description directed specifically to Kerr effect compensation will be provided. However, it should be understood at the outset that the Kerr effect compensation of the present invention has general application, and may be utilized in ring interferometers other than the type described in reference to the preferred embodiment.

Figure 1:
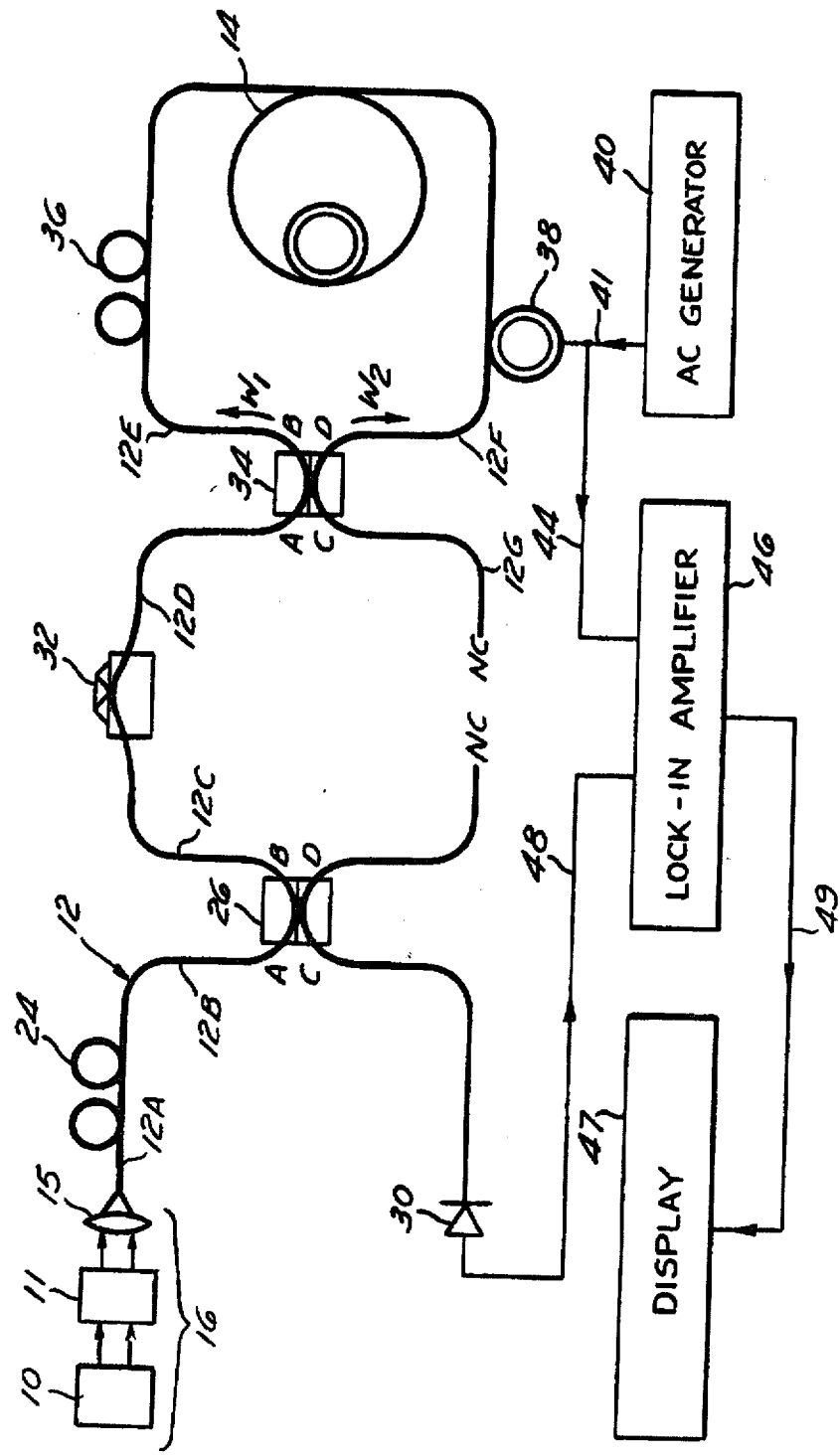
FIG. 1 is a schematic drawing of the rotation sensor of the present invention showing the fiber optic components positioned along a continuous, uninterrupted strand of fiber optic material, and further showing the signal generator, photodetector, lock-in amplifier, and display associated with the detection system.

As shown in FIG. 1, the rotation sensing interferometer of the present invention utilizes a light source 16 comprising a light emitting device 10, such as a laser or diode, for introducing light into a continuous length or strand of optical fiber 12, a portion of which is wound into a sensing loop 14. As used herein, the reference numeral 12 designates generally the entire continuous strand of optical fiber, while the numeral 12 with letter suffixes (A, B, C, etc.) designates portions of the optical fiber 12.

In one embodiment, the device 10 comprises a helium neon (HeNe) laser which oscillates in a single mode and produces light having a wavelength on the order of 0.633 microns, such as a Model 100 HeNe laser, commercially available from Coherent, Tropel Division, Fairport, N.Y. Light from the laser 10 having, e.g., a peak power of 100 microwatts, passes through an amplitude modulator 11, which forms a part of the light source 16. This modulator 11 may, for example, comprise an electro-optic modulator comprising an LiTaO$_3$ crystal and a polarizer biased for an on-off ration between 10 and 20 dB and driven by a 1.1 MHz square wave with an 80 nsec rise time.

In another embodiment, the light emitting device 10 produces plural frequencies, and preferably comprises a super-radiant diode or a super luminescent diode which operates according to the principles of stimulated emission in a plurality of modes. As discussed in detail below, this embodiment may be used with or without a modulator 11, depending on the frequency characteristics of the device 10. By way of specific example, the device 10 may comprise a GaAlAs double-heterostructure laser as described by Wang, et al., Appl. Phy. Lett. 41(7), 1 Oct. 1982, pp. 587-589.

The fiber optic strand 12 may comprise a single mode fiber having, for example, an outer diameter of 80 microns and a core diameter of 4 microns. The loop 14 comprises a plurality of turns of the fiber 12, wrapped about a spool or other suitable support (not shown). By way of specific example, the loop 14 may have approximately 1,000 turns of fiber wound on a form having a diameter of 14 centimeters.

Preferably, the loop 14 is wound symmetrically, starting from the center, so that symmetrical points in the loop 14 are in proximity. Specifically, the fiber is wrapped about the spool so that the turns of the central portion of the loop 14 are positioned innermost adjacent to the spool and the turns toward the ends of the loop are positioned outermost away from the spool so that both end portions of the fiber loop 14 are positioned symmetrically about the central turns and are freely accessible at the outside of the loop 14. It is believed that this reduces the environmental sensitivity of the rotation sensor, since such symmetry causes time varying temperature and pressure gradients to have a similar effect on both of the counterpropagating waves.

Light from the light source 16 is optically coupled to one end of the fiber 12 by a lens 15. Various components for guiding and processing the light are positioned or formed at various locations along the continuous strand 12. For the purpose of describing the relative locations of these components, the continuous fiber 12 will be described as being divided into seven portions, labeled 12A through 12G, respectively, with the portions 12A through 12E being on the side of the loop 14 that is coupled to the source 16, and the portions 12F and 12G being on the opposite side of the loop 14.

Adjacent to the light source 16, between the fiber portions 12A and 12B, is a polarization controller 24. A suitable type of polarization controller for use as the controller 24 is described in *Electronics Letters*, Vol. 16, No. 20 Sept. 25, 1980), pp. 778-780, and in U.S. patent application Ser. No. 183,975, now issued as U.S. Pat. No. 4,389,090, which are hereby incorporated by reference herein. A description of the polarization controller 24 will be provided subsequently; however, it should be presently understood that the controller 24 permits adjustment of both the state and direction of polarization of the applied light.

The fiber 12 then passes through ports, labeled A and B, of a directional coupler 26, located between the fiber portions 12B and 12C, for coupling optical power to a second strand of optical fiber 28 which passes through the ports labeled C and D of the coupler 26, the port C being on the same side of the coupler as the port A, and the port D being on the same side of the coupler as the port B. The end of the fiber 28 extending from the port D terminates non-reflectively at the point labeled "NC" (for "not connected") while the end of the fiber 28 extending from the port C is optically coupled to a photodetector 30. By way of specific example, the photodetector 30 may comprise a standaard, reverse-biased, silicon, pin-type photodiode. A coupler suitable for use in the present invention is described in detail in U.S. patent application Ser. No. 300,955, now issued as U.S. Pat. No. 4,536,058, European Patent Application No. 81.102677.3, published in Bulletin No. 81/42 of Oct. 21, 1981, under publication No. 0038023, which are incorporated by reference herein.

After passing through the polarizer 32, the fiber 12 passes through ports, labeled A and B, of a directional coupler 34, located between the fiber portions 12D and 12E. The coupler 34 is preferably of the same type as described above in reference to the coupler 26. The fiber 12 is then wound into the loop 14, with a polarization controller 36 located between the loop 14 and fiber portion 12F. The polarization controller 36 may be of the type discussed in reference to the controller 24, and is utilized to adjust the polarization of the waves counterpropagating through the loop 14 so that the optical output signal, formed by superposition of these waves, has a polarization which will be efficiently passed, with minimal optical power loss, by the polarizer 32. Thus, by utilizing both the polarization controllers, 24, 36, the polarization of the light propagating through the fiber 12 may be adjusted for maximum optical power.

A phase modulator 38, driven by an AC generator 40, and connected thereto by a line 41, is mounted on the fiber 12, between the loop 14 and the fiber portion 12F. This modulator 38 comprises a PZT cylinder, around which the fiber 12 is wrapped. The fiber 12 is bonded to the cylinder so that when it expands radially in response to the modulating signal from the generator 40, it stretches the fiber 12. An alternative type of phase modulator (not shown), suitable for use with the present invention, comprises a PZT cylinder which longitudinally stretches four segments of the fiber 12 bonded to short lengths of capillary tubing at the ends of the cylinder. Those skilled in the art will recognize that this alternative type of modulator may impart a lesser degree of polarization modulation to the propagating optical signal than the modulator 38; however, it will be seen subsequently that the phase modulator 38 may be operated at a frequency which eliminates the undesirable effects of phase modulator-induced polarization modulation. Thus, either type of phase modulator is suitable for use in the present invention.

In the above-discussed embodiment which utilizes the helium neon laser, a second phase modulator (not shown), similar to the modulator 38 but operating at a different frequency, is mounted at the center of the loop 14. This modulator is utilized to reduce the effects of backscattered light, as discussed hereinafter.

The fiber 12 then passes through ports, labeled C and D of the coupler 34, with the fiber portion 12F extending from the port D and the fiber portion 12G extending from the port C. Fiber portion 12G terminates nonreflectively at a point labeled "NC" (for "not connected"). The output signal from the AC generator 40 is supplied on a line 44 to a lock-in amplifier 46, which also is connected to receive the output of the photodetector 30 by a line 48. This signal to the amplifier 46 provides a reference signal for enabling the amplifier 46 to synchronously detect the detector output signal at the modulation frequency of the phase modulator 38. Thus, the amplifier 46 effectively provides a bandpass filter at the fundamental frequency (i.e., first harmonic) of the phase modulator 38, blocking all other harmonics of this frequency. The detected signal is integrated over a period of time, typically on the order of 1 second to 1 hour, to average out random noises. It will be seen below that the magnitude of this first harmonic component of the detector output signal is proportional, through an operating range, to the rotation rate of the loop 14. The amplifier 46 outputs a signal, which is proportional to this first harmonic component, and thus provides a direct indication of the rotation rate, which may be visually displayed on a display panel 47 by supplying the amplifier output signal to the display panel 47 on a line 49.

The Couplers 26 and 34

Figure 2:
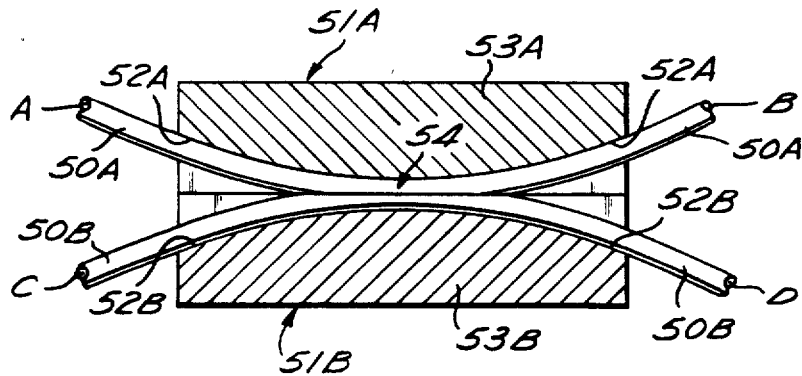
FIG. 2 is a sectional view of one embodiment of a fiber optic directional coupler for use in the rotation sensing interferometer of FIG. 1.

A preferred fiber optic directional coupler for use as the couplers 26 and 34 in the rotation sensor or gyroscope of the present invention is illustrated in FIG. 2. The coupler includes two strands 50A and 50B of a single mode fiber optic material mounted in longitudinal arcuate grooves 52A and 52B, respectively, formed in optically flat, confronting surfaces of rectangular bases or blocks 53A and 53B, respectively. The block 53A with the strand 50A mounted in the groove 52A will be referred to as the coupler half 51A, and the block 53B with the strand 50B mounted in the groove 52B will be referred to as the coupler half 51B.

The arcuate grooves 52A and 52B have a radius of curvature which is very large compared to the diameter of the fibers 50, and have a width slightly larger than the fiber diameter to permit the fibers 50, when mounted therein, to conform to a path defined by the bottom walls of the grooves 52. The depth of the grooves 52A and 52B varies from a minimum at the center of the blocks 53A and 53B, respectively, to a maximum at the edges of the blocks 53A and 53B, respectively. This advantageously permits the fiber optic strands 50A and 50B, when mounted in the grooves 52A and 52B, respectively, to gradually converge toward the center and diverge toward the edges of the blocks 53A, 53B, thereby eliminating any sharp bends or abrupt changes in direction of the fibers 50 which may cause power loss through mode perturbation. In the embodiment shown, the grooves 52 are rectangular in cross-section; however, it will be understood that other suitable cross-sectional contours which will accommodate the fibers 50 may be used alternatively, such as a U-shaped cross-section or a V-shaped cross-section.

At the centers of the blocks 53, in the embodiment shown, the depth of the grooves 52 which mount the strands 50 is less than the diameter of the strands 50, while at the edges of the blocks 53, the depth of the grooves 52 is preferably at least as great as the diameter of the strands 50. Fiber optic material was removed from each of the strands 50A and 50B, e.g., by lapping to form respective oval-shaped planar surfaces, which are coplanar with the confronting surfaces of the blocks 53A, 53B. These oval surfaces, where the fiber optic material has been removed, will be referred to herein as the fiber "facing surfaces." Thus, the amount of fiber optic material removed increases gradually from zero towards the edges of the blocks 53 to a maximum towards the center of the blocks 53. This tapered removal of the fiber optic material enables the fibers to converge and diverge gradually, which is advantageous for avoiding backward reflection and excess loss of light energy.

In the embodiment shown, the coupler halves 51A and 51B are identical, and are assembled by placing the confronting surfaces of the blocks 53A and 53B together, so that the facing surfaces of the strands 50A and 50B are in facing relationship.

An index matching substance (not shown), such as index matching oil, is provided between the confronting surfaces of the blocks 53. This substance has a refractive index approximately equal to the refractive index of the cladding, and also functions to prevent the optically flat surfaces from becoming permanently locked together. The oil is introduced between the blocks 53 by capillary action.

An interaction region 54 is formed at the junction of the strands 50, in which light is transferred between the strands by evanescent field coupling. It has been found that, to ensure proper evanescent field coupling, the amount of material removed from the fibers 50 must be carefully controlled so that the spacing between the core portions of the strands 50 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 50 is within the critical zone, each strand receives a significant portion of the evanescent field energy from the other strand, and good coupling is achieved without significant energy loss. The critical zone includes that area in which the evanescent fields of the fibers 50A and 50B overlap with sufficient strength to provide coupling, i.e., each core is within the evanescent field of the other. However, as previously indicated, mode perturbation occurs when the cores are brought too close together. For example, it is believed that, for weakly guided modes, such as the $TE_{11}$ mode in single mode fibers, such mode perturbation begins to occur when sufficient material is removed from the fibers 50 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown, the required center-to-center spacing between the strands 50 at the center of the coupler is typically less than a few (e.g., 2-3) core diameters.

Preferably, the strands 50A and 50B (1) are identical to each other; (2) have the same radius of curvature at the interactio region 54; and (3) have an equal amount of fiber optic material removed therefrom to form their respective facing surfaces. Thus, the fibers 50 are symmetrical, through the interaction region 54, in the plane of their facing surfaces, so that their facing surfaces are coextensive if superimposed, which ensures that the two fibers 50A and 50B will have the same propagation characteristics at the interaction region 54, and thereby avoids coupling attenuation associated with dissimilar propagation characteristics.

The blocks or bases 53 may be fabricated of any suitable rigid material. In one presently preferred embodiment, the bases 53 comprise generally rectangular blocks of fused quartz glass approximately 1 inch long, 1 inch wide and 0.4 inch thick. In this embodiment, the fiber optic strands 50 are secured in the slots 52 by suitable cement, such as epoxy glue. One advantage of the fused quartz blocks 53 is that they have a coefficient of thermal expansion similar to that of glass fibers, and this advantage is particularly important if the blocks 53 and fibers 50 are subjected to any heat treatment during the manufacturing process. Another suitable material for the block 53 is silicon, which also has excellent thermal properties for this application.

The coupler includes four ports, labeled A, B, C and D, in FIG. 2. When viewed from the perspective of FIG. 2, ports A and C, which correspond to strands 50A and 50B, respectively, are on the left-hand side of the coupler, while the ports B and D, which correspond to the strands 50A and 50B, respectively, are on the right-hand side of the coupler. For the purposes of discussion, it will be assumed that input light is applied to port A. This light passes through the coupler and is output at port B and/or port D, depending upon the amount of power that is coupled between the strands 50. In this regard, the term "normalized coupled power" is defined as the ratio of the coupled power to the total output power. In the above example, the normalized coupled power would be equal to the ratio of the power at port D of the sum of the power output at ports B and D. The ratio is also referred to as the "coupling efficiency", and when so used, is typically expressed as a percent. Thus, when the term "normalized coupled power" is used herein, it should be understood that the corresponding coupling efficiency is equal to the normalized coupled power times 100. In this regard, tests have shown that the coupler of the type shown in FIG. 2 has a coupling efficiency of up to 100%. However, the coupler may be "tuned" to adjust the coupling efficiency to any desired value between zero and the maximum, by offsetting the facing surfaces of the blocks 53. Such tuning is preferably accomplished by sliding the blocks 53 laterally relative to each other.

The coupler is highly directional, with substantially all of the power applied at one side of the coupler being delivered to the other side of the coupler. That is, substantially all of the light applied to input Port A is delivered to the output Ports B and D, without contra-directional coupling to Port C. Likewise, substantially all of the light applied to input Port C is delivered to the output Ports B and D. Further, this directivity is symmetrical. Thus, light supplied to either input Port B or input Port D is delivered to the output Ports A and C. Moreover, the coupler is essentially non-discriminatory with respect to polarizations, and thus, preserves the polarization of the coupled light. Thus, for example, if a light beam having a vertical polarization is input to Port A, the light coupled from Port A to Port D, as well as the light passing straight through from Port A to Port B, will remain vertically polarized.

From the foregoing, it can be seen that the coupler may function as a beam-splitter to divide the applied light into two counterpropagating waves W1, W2 (FIG. 1). Further, the coupler may additionally function to recombine the counterpropagating waves after they have traversed the loop 14 (FIG. 1).

In the embodiment shown, each of the couplers 26, 34 has a coupling efficiency of about 50%, which provides maximum optical power at the photodetector 30 (FIG. 1). As used herein, the term "coupling efficiency" is defined as the power ratio of the coupled power to the total output power, expressed as a percent. For example, referring to FIG. 2, if light is applied to Port A, the coupling efficiency would be equal to the ratio of the power at Port D to the sum of the power output at Ports B and D. The terms "coupling ratio" or "splitting ratio" are defined as the coupling efficiency divided by 100. Thus, a coupling efficiency of 50% could be equivalent to a coupling rato or splitting ratio of 0.5.

The Polarizer 32

Figure 3:
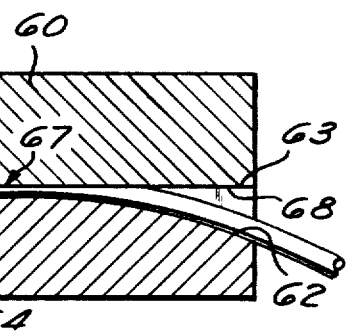
FIG. 3 is a sectional view of one embodiment of a fiber optic polarizer for use in the rotation sensor of FIG. 1.

A preferred polarizer 32 for use in the rotation sensor of FIG. 1, is illustrated in FIG. 3 and described in *Optics Letters*, Vol. 5, No. 11 (November 1980), pp. 479-481, which is hereby incorporated by reference herein. The polarizer 32 includes a birefringent crystal 60, positioned within the evanescent field of light transmitted by the fiber 12. The fiber 12 is mounted in a slot 62 which opens to the upper face 63 of a generally rectangular quartz block 64, the slot 62 has an arcuately curved bottom wall, and the fiber is mounted in the slot 62 so that it follows the contour of this bottom wall. The upper surface 63 of the block 64 is lapped to remove a portion of the cladding from the fiber 12 is a region 67. The crystal 60 is mounted on the block 64, with the lower surface 68 of the crystal facing the upper surface 63 of the block 64, to position the crystal 60 within the evanescent field of the fiber 12.

The relative indices of refraction of the fiber 12 and the birefringent material 60 are selected so that the wave velocity of the desire polarization mode is greater in the birefringent crystal 60 than in the fiber 12, while the wave velocity of an undesired polarization mode is greater in the fiber 12 than in the birefringent crystal 60. The light of the desired polarization mode remains guided by the core portion of the fiber 12, whereas light of the undesired polarization mode is coupled from the fiber 12 to the birefringent crystal 60. Thus, the polarizer 32 permits passage of light in one polarization mode, while preventing passage of light in the other polarization mode. As previously indicated, the polarization controllers 24, 36 (FIG. 1) may be utilized to adjust the polarizations of the applied light and optical output signal, respectively, so that optical power loss through the polarizer 32 is minimized.

The Polarization Controllers 24, 36

Figure 4:
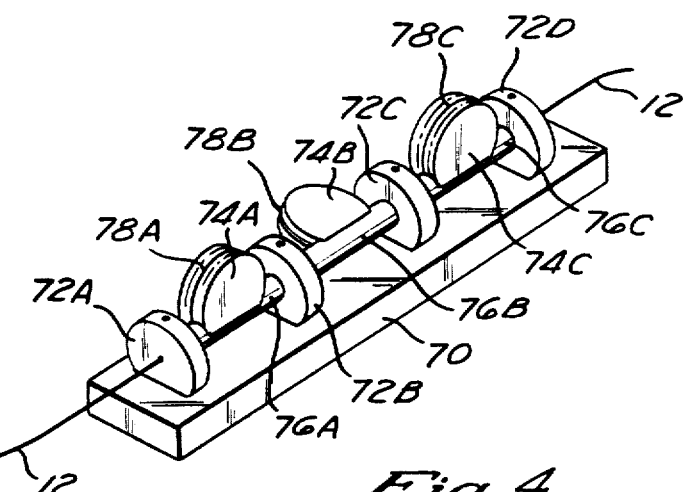
FIG. 4 is a perspective view of one embodiment of a fiber optic polarization controller for use in the rotation sensor of FIG. 1.

One type of polarization controller suitable for use in the rotation sensor of FIG. 1 is illustrated in FIG. 4. The controller includes a base 70 on which a plurality of upright blocks 72A through 72D are mounted. Between adjacent ones of the blocks 72, spools 74A through 74C are tangentially mounted on shafts 76A through 76C, respectively. The shafts 76 are axially aligned with each other, and are rotatably mounted between the blocks 72. The spools 74 are generally cylindrical and are positioned tangentially to the shafts 76, with the axes of the spools 74 perpendicular to the axes of the shafts 76. The strand 12 extends through axial bores in the shafts 76 and is wrapped about each of the spools 74 to form three coils 78A through 78C. The radii of the coils 78 are such that the fiber 12 is stressed to form a birefringent medium in each of the coils 78. The three coils 78A through 78C may be rotated independently of each other about the axes of the shafts 74A through 74C, respectively, to adjust the birefringence of the fiber 12 and, thus, control the polarization of the light passing through the fiber 12.

The diameter and number of turns in the coils 78 are such that the outer coils 78A and C provide a spatial delay of one-quarter wavelength, while the central coil 78B provides a spatial delay of one-half wavelength. The quarter wavelength coils 78A and C control the ellipticity of the polarization, and the half wavelength coil 78B controls the direction of polarization. This provides a full range of adjustment of the polarization of the light propagating through the fiber 12. It will be understood, however, that the polarization controller may be modified to provide only the two quarter wave coils 78A and C, since the direction of polarization (otherwise provided by the central coil 78B) may be controlled indirectly through proper adjustment of the ellipticity of polarization by means of the two quarter wave coils 78A and C. Accordingly, the polarization controllers 24 and 36 are shown in FIG. 1 as including only the two quarter wave coils 78A and C. Since this configuration reduces the overall size of the controllers 24, 36, it may be advantageous for certain applications of the present invention involving space limitations.

Thus, the polarization controllers 24 and 36 provide means for establishing, maintaining, and controlling the polarization of both the applied light and the counterpropagating waves.

Operation Without Phase Modulation or Polarization Control

Figure 5:
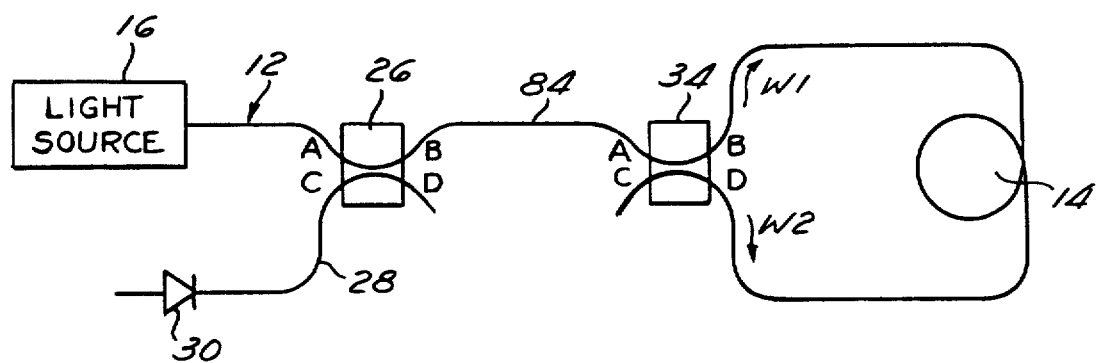
FIG. 5 is a schematic diagram of the rotation sensor of FIG. 1 with the polarizer, polarization controllers, and phase modulator removed therefrom.

In order to fully understand the function and importance of the polarizer 32 (FIG. 1) and phase modulator 38, the operation of the rotation sensor will first be described as if these components had been removed from the system. Accordingly, FIG. 5 shows the rotation sensor of FIG. 1, in schematic block diagram form, with the modulator 38, polarizer 32, and associated components removed therefrom.

Light is coupled from the source 16 to the fiber 12 for propagation therethrough. The light enters Port A of the coupler 26, where a portion of the light is lost through Port D. The remaining portion of the light propagates from Port B of the coupler 26 to Port A of the coupler 34, where it is split into two counterpropagating waves W1, W2, the wave W1 propagates from the Port B in a clockwise direction about the loop 14, while the wave W2 propagates from Port D in a counterclockwise direction around the loop 14. After the waves W1, W2 have traversed the loop 14, they are recombined by the coupler 34 to form an optical output signal, which propagates from Port A of the coupler 34 to Port B of the coupler 26. A portion of the optical output signal is coupled from Port B to Port C of the coupler 26 for propagation along the fiber 28 to the photodetector 30. This photodetector 30 outputs an electrical signal which is proportional to the intensity of the light impressed thereon by the optical output signal.

The intensity of the optical output signal will vary in accordance with the amount and type (i.e., constructive or destructive) of interference between the waves W1, W2 when they are recombined or superposed at the coupler path around the loop 14. Thus, assuming the loop 14 is at rest, when the waves W1, W2 are recombined at the coupler 34, they will interfere constructively, with no phase difference therebetween, and the intensity of the optical output signal will be at a maximum. However, when the loop 14 is rotated, the counterpropagating waves W1, W2 will be shifted in phase, in accordance with the Sagnac effect, so that when they are superposed at the coupler 34, they destructivey interfere to reduce the intensity of the optical output signal. The Sagnac phase difference between the waves W1, W2, caused by rotation of the loop 14, is defined by the following relationship:

$$\phi_{ws} = (8\pi NA/\lambda c)\Omega \qquad (1)$$

where A is the area bounded by the loop 14 of optical fiber, N is the number of turns of the optical fiber about the area A, $\Omega$ is the angular velocity of the loop about an axis which is perpendicular to the plane of the loop, and $\lambda$ and c are the free space values of the wavelength and the velocity, respectively, of the light applied to the loop.

The intensity of the optical output signal ($I_T$) is a function of the Sagnac phase difference ($\phi_{ws}$) between the waves W1, W2, and is defined by the following equation:

$$I_T = I_1 + I_2 + 2\sqrt{I_1 I_2} \cos \phi_{ws} \qquad (2)$$

where $I_1$ and $I_2$ are the individual intensities of the waves W1, W2, respectively.

From equations (1) and (2), it may be seen that the intensity of the optical output signal is a function of the rotation rate ($\Omega$). Thus, an indication of such rotation rate may be obtained by measuring the intensity of the optical output signal, utilizing the detector 30.

Figure 6:
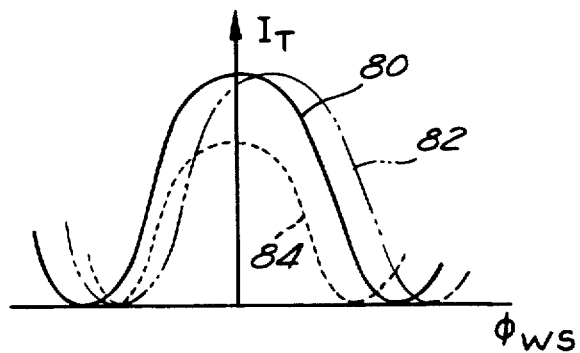
FIG. 6 is a graph of the intensity of the optical output signal, as measured by the photodetector as a function of the rotationally induced Sagnac phase difference, illustrating the effects of birefringence-induced phase differences and birefringence-induced amplitude fluctuations.

FIG. 6 shows a curve 80, which illustrates this relationship between the intensity of the optical output signal ($I_T$) and the Sagnac phase difference ($\omega_{ws}$) between the counterpropagating waves W1, W2. The curve 80 has the shape of a cosine curve, and the intensity of the optical output signal is at a maximum when the Sagnac phase different ($\phi_{ws}$) is zero.

If it is assumed that the only source of phase difference between the counerpropagating waves W1, W2 is the rotation of the loop 14, the curve 80 will vary symmetrically about the vertical axis. However, in practice, a phase difference between the counterpropagating waves W1, W2 may be caused not only by rotation of the loop 14, but also by the residual birefringence of the optical fiber 12. Birefringence-induced phase differences occur because fiber birefringence tends to cause each of the two polarization modes of the single mode fiber 12 to propagate light at a different velocity. This creates a nonreciprocal, non-rotationally-induced phase difference between the waves W1, W2, which causes the waves W1, W2 to interfere in a manner that distorts or shifts the curve 80 of FIG. 6, for example, as illustrated by the curve 82, shown in phantom lines. Such birefringence-induced, nonreciprocal phase difference is indistinguishable from a rotationally-induced Sagnac phase difference, and is dependent on environmental factors which vary fiber birefringence, such as temperature and pressure. Thus, fiber birefringence may cause errors in rotation sensing.

Operation with the Polarizer 32

The problem of nonreciprocal operation due to fiber birefringence is solved by means of the polarizer 32 (FIG. 1) which, as discussed above, permits utilization of only a single polarization mode. Thus, when the polarizer 32 is introduced into the system, at the point designated by the reference numeral 84 in FIG. 5, light input through the polarizer 32 propagates into the loop 14 in the desired polarization mode. Further, when the counterpropagating waves are recombined to form the optical output signal, any light that is not of the same polarization as the light applied to the loop is prevented from reaching the photodetector 30, since the optical output signal, as it travels from Port A of coupler 34 to Port B of coupler 26, also passes through the polarizer 32. Thus, the optical output signal, when it reaches the detector 30, will have precisely the same polarization as the light applied to the loop. Therefore, by passing the input light and optical output signal through the same polarizer 32, only a single optical path is utilized, thereby eliminating the problem of birefringence-induced phase difference. Further, it should be noted that the polarization controllers 24, 36 (FIG. 1) may be used to adjust the polarization of the applied light and optical output signal, respectively, to reduce optical power loss at the polarizer 32, and thus maximize the signal intensity at the detector 30.

Operation with the Phase Modulator 38

Referring again to FIG. 6, it will be seen that, because the curve 80 is a cosine function, the intensity of the optical output signal is nonlinear for small phase differences ($\phi_{ws}$) between the waves W1, W2. Further, the optical output signal intensity is relatively insensitive to changes in phase difference for small values of $\phi_{ws}$. Such nonlinearity and insensitivity makes it difficult to transform the optical intensity ($I_T$) measured by detector 30 into a signal indicative of the rate of rotaton $\Omega$ (equation (1)) of the loop 14.

Further, although birefringence-induced phase differences between the waves W1, W2 are eliminated, as discussed above, by use of the polarizer 32, fiber birefringence may also cause a reduction in the optical intensity of the optical output signal since light may be prevented from reaching the photodetector 30 by the polarizer 32. Thus, changes in fiber birefringence may cause the amplitude of the curve 80 of FIG. 6 to vary, for example, as illustrated by the curve 84.

Figure 7:
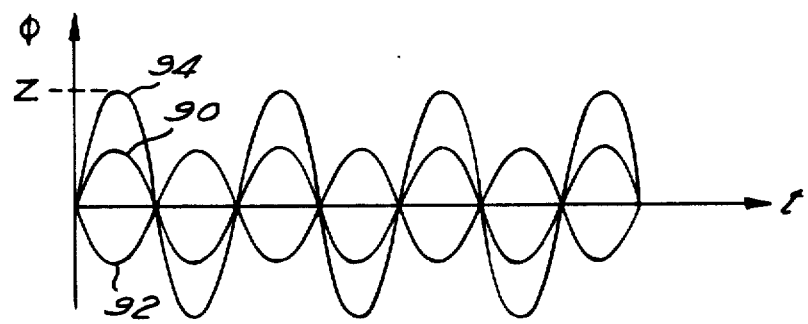
FIG. 7 is a graph of phase difference as a function of time showing the phase modulation of each of the counterpropagating waves and the phase difference between the counterpropagating waves.

The foregoing problems are solved by means of a synchronous detection system utilizing the phase modulator 38, signal generator 40 and lock-in amplifier 46, shown in FIG. 1. Referring to FIG. 7, the phase modulator 38 modulates the phase of each of the propagating waves W1, W2 at the frequency of the signal generator 40. However, as may be seen from FIG. 1, the phase modulator 38 is located at one end of the loop 14. Thus, the modulation of the wave W1 is not necessarily in phase with the modulation of the wave W2. Indeed, it is necessary for proper operation of this synchronous detection system that the modulation of the waves W1, W2 be out of phase. Referring to FIG. 7, it is preferable that the modulation of the wave W1, represented by the sinusoidal curve 90, be 180° out of phase with the modulation of the wave W2, represented by the curve 92. Use of a modulation frequency which provides such 180° phase difference between the modulation of the wave W1 relative to that of W2 is particularly advantagous inthat it eliminates modulator-induced amplitude modulation in the optical output signal measured by the detector 30. This modulation frequency ($f_m$) may be calculated using the following equation:

$$f_m = c/(2n_{eq}L) \tag{3}$$

where L is the differential fiber length between the coupler 34 and modulator 38, for the counterpropagating waves W1, W2 (i.e., the distance measured along the fiber between the modulator 38 and a symmetrical point on the other side of the loop 14); $n_{eq}$ is the equivalent refractive index for the single mode fiber 12; and c is the free space velocity of the light applied to the loop 14.

At this modulation frequency ($f_m$), the phase difference ($\phi_{ws}$) between the counterpropagating waves W1, W2, due to phase modulation of these waves in accordance with the curves 90 and 92, is illustrated by the sinusoidal curve 94 in FIG. 7. This modulation of the phase difference between the waves W1, W2 will modulate the intensity ($I_T$) of the optical output signal in accorance with the curve 80 of FIG. 6, since such phase modulation $\phi_{wm}$ is indistinguishable from rotationally-induced Sagnac phase differences $\phi_{ws}$.

Figure 8:
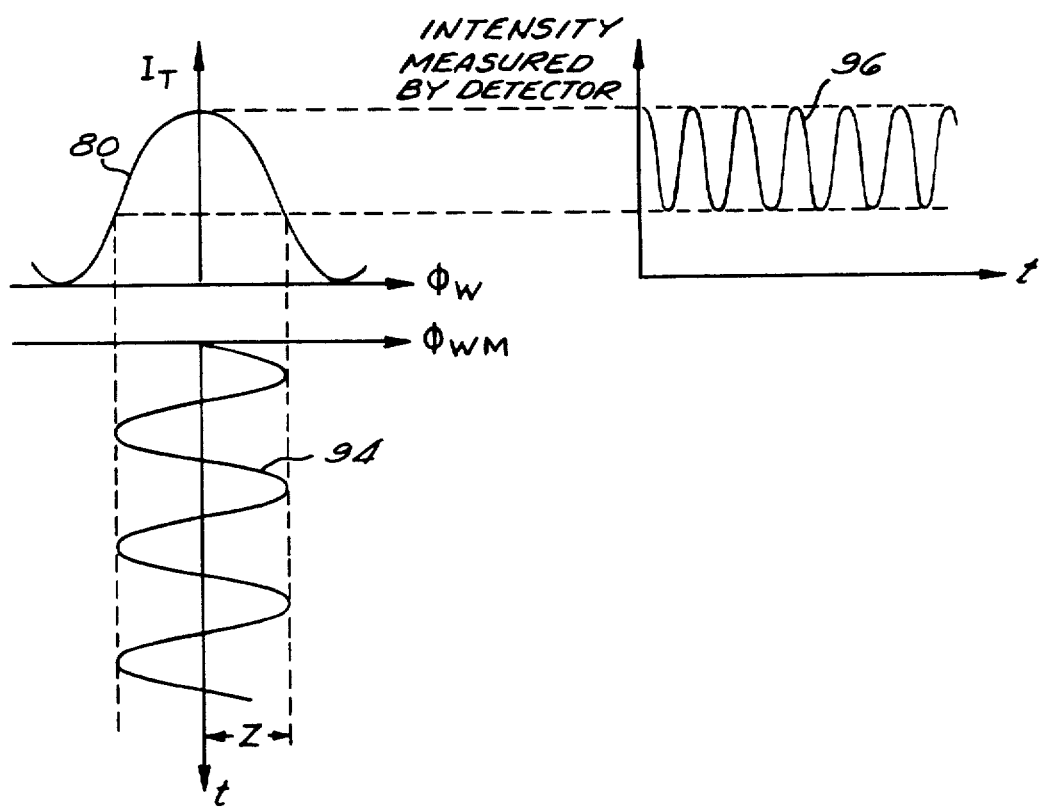
FIG. 8 is a schematic drawing illustrating the effect of the phase modulation upon the intensity of the optical output signal, as measured by the detector, when the loop is at rest.
Figure 9:
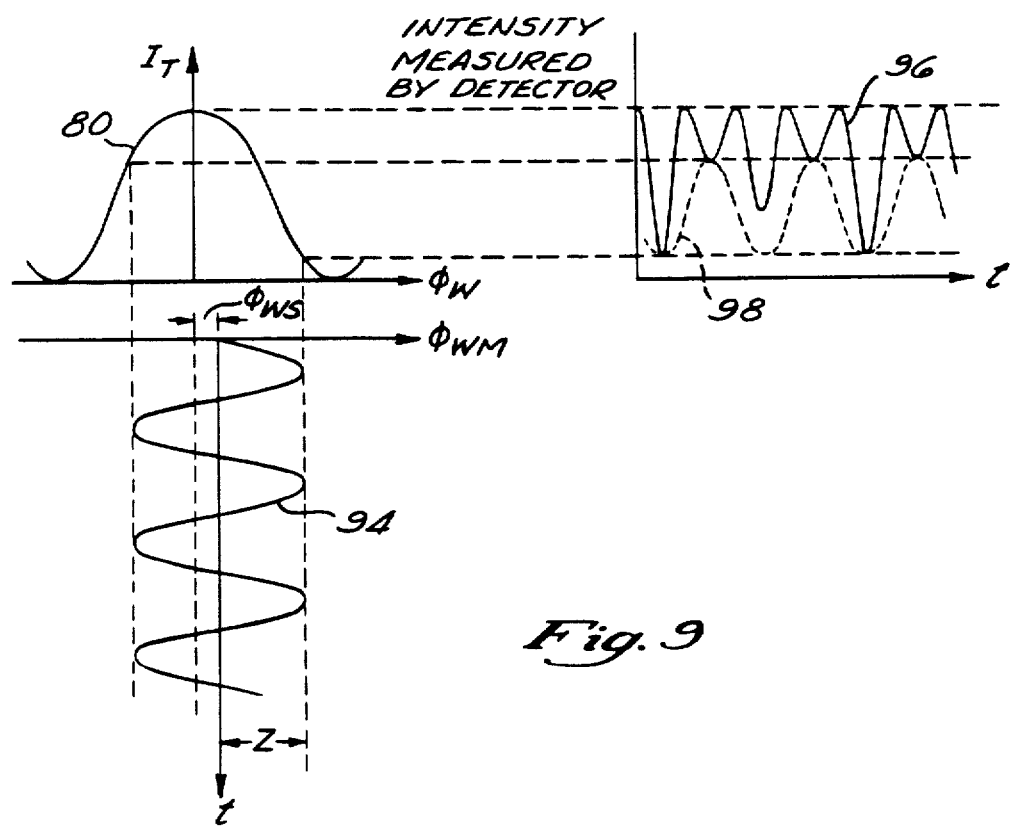
FIG. 9 is a schematic drawing showing the effect of the phase modulation upon the intensity of the optical output signal, as measured by the detector, when the loop is rotating.

The foregoing may be understood more fully through reference to FIGS. 8 and 9 which graphically illustrate the effect of (a) the phase modulation $\phi_{wm}$, defined by the curve 94 of FIG. 7 and (b) the Sagnac phase difference $\phi_{ws}$ upon the intensity ($I_T$) of the optical output signal, represented by the curve 80 of FIG. 6. However, before proceeding with a disucssion of FIGS. 7 and 8, it should first be understood that the intensity ($I_T$) of the modulated optical output signal is a function of the total phase difference between the waves W1, W2. Further, such total phase difference is comprised of both the rotationally-induced Sagnac phase difference $\phi_{ws}$ and the time-varying modulation-induced phase difference $\phi_{wm}$. Thus, the total phase difference $\phi_w$ between the waves W1, W2 may be expressed as follows:

$$\phi_w = \phi_{ws} + \phi_{wm} \tag{4}$$

Accordingly, since the effects of the modulation-induced phase difference $\phi_{wm}$, as well as the rotationally-induced phase difference $\phi_{ws}$ will be considered in reference to FIGS. 8 and 9, the horizontal axis for the curve 80 has been relabeled as $\phi_w$ to indicate that the total phase difference is being considered, rather than only the rotationally-induced phase difference, as in FIG. 6.

Referring now to FIG. 8, the effect of the phase modulation $\phi_{wm}$ (curve 94) upon the intensity $I_T$ of the optical output signal (curve 80) will be discussed. In FIG. 8, it is assumed that the loop 14 is at rest, and thus, the optical signal is not affected by the Sagnac effect. Specifically, it may be seen that the modulation-induced phase difference curve 94 varies the optical output signal in accordance with the curve 80, symmetrically about is vertical axis, so that the optical intensity measured by the detector 30 varies periodically at a frequency equal to the second harmonic of the modulating frequency, as shown by the curve 96. Since, as discussed above, the lock-in amplifier 46 is enabled by the signal generator 40 (FIG. 1) to synchronously detect the detector output signal at the modulation frequency (i.e., first harmonic) of the modulator 38, and since the detector output signal is at the second harmonic of the modulation frequency, as shown by the curve 96, the amplifier output signal will be zero and the display 47 will indicate a rotation rate of zero. It should be noted that even if birefringence-induced amplitude fluctuations occur in the optical output signal, as discussed in reference to he curve 84 of FIG 6, the curve 96 of FIG. 8 will remain at a second harmonic frequency. Thus, such birefringence-induced amplitude fluctuations will not affect the amplifier 46 output signal. The detection system, therefore, provides a substantially stable operating point that is insensitive to changes in birefringence, particularly when the loop14 is at rest.

When the loop 14 is rotated, the counterpropagating waves W1, W2 are shifted in phase, as discussed above, in accordance with he Sagnac effect. The Sagnac phase shift provides a phase difference $\phi_{ws}$ which adds to the phase difference $\phi_{wm}$ created by the modulator 38, so that the entire curve 94 is translated in phase from the position shown in FIG. 8, by an amount equal to $_{ws}$, to the position shown in FIG. 9. This causes the optical output signal to vary non-symmetrically in accordance with the curve 80, thereby harmonically distorting this signal, as shown by the curve 96 of FIG. 9, so that it includes a component at the fundamental (i.e., first harmonic) frequency of the modulator 38, as illustrated in phantom lines by the sinusoidal curve 98. It will be seen subsequently that the RMS value of this sinusoidal curve 98 is proportional to the sine of the rotationally-induced Sagnac phase difference $\phi_{ws}$. Since the amplifier 46 synchronously detects signals having the fundamental frequency of the modulator 38, the amplifier 46 will output a signal to the display 47 that is proportional to the RMS value of the curve 98 to indicate the rotation rate of the loop.

The drawings of FIG. 9 illustrate the intensity waveform of the optical output signal for one direction of rotation (e.g., clockwise) of the loop 14. However, it will be understood that if the loop 14 is rotated in the opposite direction (e.g., counterclockwise) at an equal velocity, the intensity waveform 96 of the optical output signal will be exactly the same as illustrated in FIG. 9, except that it will be translated so that the curve 98 is shifted 180° from the position shown in FIG. 9. The lock-in amplifier 46 detects this 180° phase difference for the curve 98 by comparing its phase with the phase of the reference signal from the signal generator 40 to determine whether the rotation of the loop is clockwise or counterclockwise. Depending on the direction of rotation, the amplifier 46 outputs either a positive or negative signal to the display 47. However, regardless of the direction of rotation, the magnitude of the signal is the same for equal rates of rotation of the loop 14.

Figure 10:
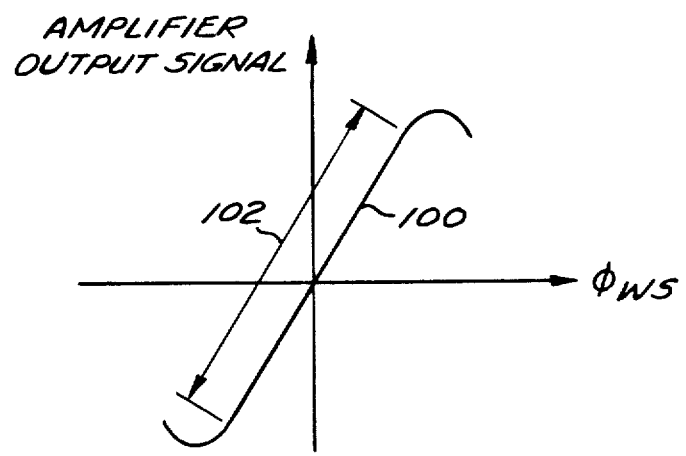
FIG. 10 is a graph of the amplifier output signal as a function of the rotationally-induced Sagnac phase difference, illustrating an operating range for the rotation sensor of FIG. 1.

The waveform of the amplifier output signal is shown in FIG. 10 as the curve 100. It will be seen that this curve 100 is sinusoidal and varies positively or negatively from zero rotation rate depending on whether the rotation of the loop 14 is clockwise or counterclockwise. Further, the curve 100 has a substantially linear portion 102 which varies symmetrically about the origin and provides a relatively wide operating rate for measuring rotation. Moreover, the slope of the curve 100 provides excellent sensitivity throughout its linear operating range 102.

Thus, by utilizing the synchronous detection system, the above-described problems of nonlinearity, insensitivity and birefringence-induced amplitude fluctuations are reduced or eliminated.

A further advantage of this detection system relates to the fact that state-of-the-art phase modulators, such as the modulator 38, induce amplitude modulation in the optical output signal, either directly or indirectly, through polarization modulation. However, it will be recalled from the discussion in referenced to equation (3) that by operating at a specific frequency at which the phase difference between the modulation of the waves W1, W2 is 180°, the odd harmonic frequency components of the amplitude modulation, that are induced in each of the counterpropagating waves W1, W2 by the modulator 38, cancel each other when the waves are superimposed to form the optical output signal. Thus, since the above-described detection system detects only an odd harmonic (i.e., the fundamental frequency) of the optical output signal, the effects of amplitude modulations are eliminated. Therefore, by operating at the specific frequency defined by equation (3) and detecting only an odd harmonic of the optical output signal, the rotation sensor of the present invention may operate independently of modulator-induced amplitude and polarization modulations.

A further benefit of operating at the specific frequency is that even harmonics of the phase modulations, induced by the modulator 38 in each of the counterpropagating phases W1, W2 cancel when these waves are superposed to form the optical output signal. Since these even harmonics may produce spurious odd harmonics in the optical output signal which might otherwise be detected by the detection system, their elimination improves the accuracy of rotation sensing.

In addition to operating the phase modulator 38 at the frequency defined by equation (3), it is also preferable to adjust the magnitude of the phase modulation so that the amplitude of the detected first harmonic of the optical output signal intensity is maximized, since this provides improved rotation sensing sensitivity and accuracy. It has been found that the first harmonic of the optical output signal intensity is at the maximum for a given rotation rate when the amplitude of the modulator-induced phase difference between the waves W1, W2 indicated by the dimension, labeled z in FIGS. 7, 8 and 9, is 1.84 radians. This may be understood more fully through reference to the following equation for the total intensity ($I_T$) of two superposed waves having individual intensities of $I_1$ and $I_2$, respectively, with a phase difference $\phi_w$ therebetween.

$$I_T = I_1 + I_2 + 2\sqrt{I_1 I_2} \cos \phi_w \tag{5}$$

where:

$$\phi_w = \phi_{ws} + \phi_{wm} \quad (6)$$

and $$\phi_{wm} = Z \sin(2\pi f_m t) \quad (7)$$

Thus, $$\phi_w = \phi_{ws} + z \sin(2\pi f_m t) \quad (8)$$

the Fourier expansion of cosine $\phi_w$ is:

$$\cos\phi_w = \cos\phi_{ws}\left(J_0(z) + 2\sum_{n=1}^{\infty} J_{2n}(z)\cos[2\pi(2nf_m t)]\right) - \sin\phi_{ws}\left(2\sum_{n=1}^{\infty} J_{2n-1}(z)\sin[2\pi(2n-1)f_m t]\right) \quad (9)$$

where $J_n(z)$ is the $n^{th}$ Bessel function of the variable z, and z is the peak amplitude of the modulator-induced phase difference between the waves W1, W2.

Therefore, detecting only the first harmonic of $I_T$ yields:

$$I_{T(1)} = 4\sqrt{I_1 I_2} J_1(z) \sin\phi_{ws} \sin(2\pi f_m t) \quad (10)$$

Thus, the amplitude of the first harmonic of the optical output signal intensity is dependent upon the value of the first Bessel function $J_1(z)$. Since $J_1(z)$ is a maximum when z equal 1.84 radians, the amplitude of the phase modulation should preferably be selected so that the magnitude of the modulator-induced phase difference (z) between the waves W1, W2 is 1.84 radians.

Reducing the Effects of Backscatter

As is well known, present state-of-the-art optical fibers are not optically perfect but have imperfections which cause scattering of small amounts of light. This phenomena is commonly referred to as Rayleigh scattering. Although such scattering causes some light to be lost from the fiber, the amount of such loss is relatively small and, therefore, is not a major concern. The principal problem associated with Rayleigh scattering relates not to scattered light which is lost but, rather to light which is reflected so that it proopagates through the fiber in a direction opposite to its original direction of propagation. This is commonly referred to as "backscattered" light. Since such backscattered light is coherent with the light comprising the counterpropagating waves W1, W2, it can constructively or destructively interfere with such propagating waves, and thereby cause "noise" in the system, i.e., cause spurious variations in the intensity of the optical output signal, as measured by the detector 30.

Destructive or constructive interference between the backscattered waves and the propagating waves may be reduced by means of the additional phase modulator 39 at the center of the fiber loop 14. This phase modulator is driven by a signal generator (not shown) which is not synchronized with the modulator 38.

The propagating waves will pass through this additional phase modulator one time only, on their travel around the loop. For backscatter which occurs from a propagating wave before the wave reaches the additional modulator, the backscatter will not be phase modulated by this additional modulator, since neither its source propagating wave nor the backscatter itself has passed through the additional modulator.

On the other hand, for backscatter which occurs from a propagating wave after the wave passes through this additional phase modulator, the backscatter will be effectively twice phase modulated, once when the propagating wave passed through the additional phase modulator, and once the backscatter passed through the additional modulator.

Thus, if the additional phase modulator introduces a phase shift of $\phi(t)$, the backscattered wave originating at any point except at the center of the loop 14 will have a phase shift of either zero, or 2 $\phi(t)$, either of which is time varying with respect to the $\phi(t)$ phase shift for the propagating wave. This time varying interference will averge out over time, effectively eliminating the effects of the backscattered light.

Kerr Effect

As previously indicated, the Kerr effect refers to a phenomenon in which the refractive index of a substance changes in the presence of a varying electric field. In a nonlinear medium the optical Kerr effect may induce an unequal phase delay for counterpropagating waves. Fused silica optical fibers such as the fiber 12 are sufficiently nonlinear that the Kerr-induced phase difference in a fiber optic rotation sensor may be much larger than the phase difference due to the Sagnac effect.

In optical fibers, the electric fields of lightwaves can change the refractive index and, therefore, the propagation constants of the fiber in accordance with the AC Kerr effect. The amount of Kerr effect is a function of the square of the electric fields or the light intensity. For inertial navigation accuracies, the Kerr effect, in an interferometer such as described above, becomes a problem when the combined intensities of the waves W1, W2 are greater than about 1 watt/cm².

For waves counterpropagating through a fiber, as in a ring interferometer, the Kerr effect is more complex than if there is only a single wave, since the Kerr-induced change in propagation constant of either wave is not only a function of the intensity of the wave itself, but also of the intensity of the other wave. In this regard, the term "self effect" will be used to refer to the effect of a first of two counterpropagating waves upon the propagation constant of the first wave, while the term "cross effect" will be used to refer to the change in propagation constant of that same first wave, caused by the electric field of the second wave, propagating in the opposite direction. Stated another way, if one imagines himself as an observer traveling with a first wave at the same speed and in the same direction, the propagation constant of the fiber, as viewed by that observer, will be a function of the intensity of the wave he is traveling with (the self effect), and also a function of the intensity of the wave coming toward him (the cross effect). The Kerr-induced change in the propagation constants for each of two counterpropagating waves may be described as the seum of the self effect plus the cross effect.

If the self effect and the cross effect were to influence the propagation constant by equal amounts, the propagation constant seen by each wave would be the same, regardless of the relative intensities of the two waves, and thus, each of the counterpropagating waves would traverse the loop 14 with equal propagation velocities, thus resulting in reciprocal operation of the interferometer. Unfortunately, however, the cross effect has twice the influence on the propagation constants as the self effect and, therefore, unless the respective intensities of the waves are precisely equal (so that the cross effects are equal and the self effects are equal), one of the counterpropagating waves will have a different propagation constant than the other. Consequently, their propagation velocities will be different (propagation velocity is a function of the propagation constant), and one of the waves will traverse the loop 14 more rapidly than the other, creating a phase difference between the waves when they are combinated at the coupler 34. This Kerr-induced phase difference is indisguishable from a rotationally induced (Sagnac) phase difference, and thus, results in a spurious rotation signal.

The optical Kerr effect manifests itself as intensity-dependent perturbations of the propagation constants of the fiber 12. The perturbations of the propagation constants are functions of the states of polarization of the two counterpropagating waves. Therefore, in a fiber rotation sensor it is preferable that the states of polarization of the counterpropagating waves be identical. The polarizer 32 permits utilization of only a single polarization mode in the loop 14. Therefore, in the following analysis of the Kerr it is assumed that the counterpropagating waves have identical, linear polarizations.

From a mathematical perspective, the perturbations of the propagating constants of the counterpropagating waves may be viewed as:

$$\beta k_1(z,t) = (4\pi \eta n/\lambda)\delta[I_1(z,t) + 2I_2(z,t)] \quad (11)$$

$$\beta k_2(z,t) = (\pi \eta n/\lambda)\delta[I_2(z,t) + 2I_1(z,t)] \quad (12)$$

where $\eta$ is the impedance of the medium, $\lambda$ is the vacuum wavelength of the waves, n is the Kerr coefficient of the medium, and $\delta$ is a factor of order unity that depends on the transverse distribution of the light mode in the fiber 12. $I_1(z,t)$ and $I_2(z,t)$ are the wave transverse peak intensities, which depend upon the displacement around the loop and upon time.

An important feature of equations (11) and (12) is the factor of 2 between $I_1$ and $I_2$ that shows, that the intensity of wave 2 has twice the effect on the propagation constant of wave 1 as does the intensity of wave 1 on itself. As discussed above, the term "self effect" is used herein to refer to the effect which the electric field of a lightwave has upon the propagation constant seen by the same lightwave. The term "cross effect" is used herein to refer to the change in propagation constant of the lightwave caused by the electric field of another lighwave which propagates in the opposite direction. Referring to equation (12), the cross effect of wave 1 on the propagation constant of wave 2 is twice the self effect of wave 2. The cross effects being twice the self effects gives rise to a nonreciprocity by causing the perturbations of the propagation constants to be different if the intensities $I_1$ and $I_2$ are not the same. No nonreciprocity would occur if the perturbations were to depend simply on the sum of the two intensities and no nonreciprocity would occur if the intensities $I_1$ and $I_2$ were the same because then $I_1 + 2I_2 + 2I_1$.

The nonreciprocity causes the propagation velocities of the two waves, W1 and W2, to be different because propagation velocity is a function of the propagation constant. Therefore, one of the waves, W1, W2 will traverse the loop 14 more rapidly than the other, thereby creating a phase difference between the waves W1, W2 at the coupler 34. The Kerr effect-induced phase difference is indistinguishable from a rotationally-induced phase difference, thereby resulting in a serious rotation signal.

As the waves W1, W2 propagate, the cross effect is particularly important in giving rise to Kerr effect-induced phase differences. Intensity modulation of the waves, W1 and W2, in accordance with a specific waveform, serves to reduce or eliminate the relative influence of the cross effect.

Kerr Compensation by Intensity Modulation

Figure 11:
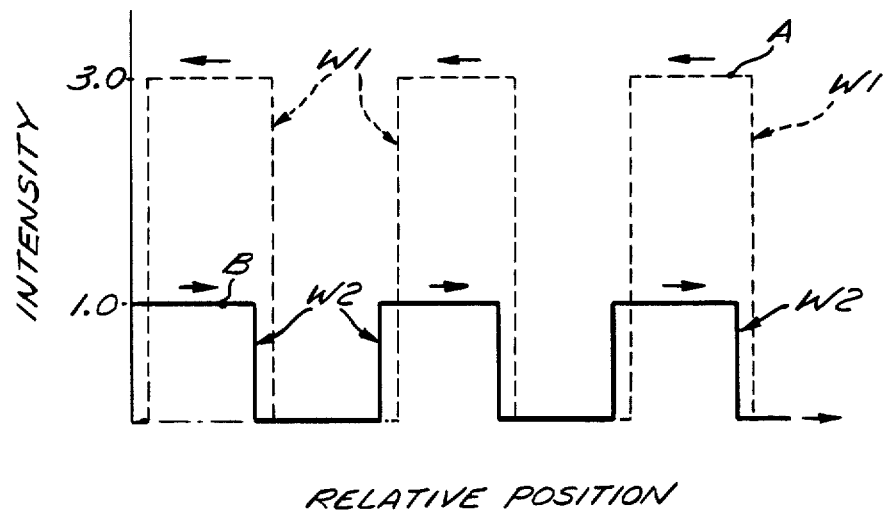
FIG. 11 is a simplified schematic drawing of a pair of square wave, intensity modulated lightwaves, counterpropagating through the loop of fiber optic material, and having substantially dissimilar peak intensities, to illustrate intensity-independent Kerr effect compensation.

The use of intensity modulation to control the phase shift caused by the Kerr effect may be more easily understood through reference to FIG. 11, which illustrates a pair of square wave intensity modulated counterpropagating lightwaves, which each have a duty cycle of 50%. The cross effect is present when the intensities of the two waves, W1 and W2, have coincident peaks; otherwise the cross effect is absent, and each wave W1, W2, experiences only the self effect. Each portion of the waves, W1, W2, experiences the self effect all the time and the cross effect half of the time because of the 50% duty cycle. Therefore, the factor of 2 in equations (11) and (12) is reduced to an average value of unity, thereby effectively cancelling the nonreciprocity. Nonreciprocal phase accumulated over half of the cycle is compensated for by the nonreciprocal phase of the opposite sign accumulated by an adjustment in the duty cycle of the pulse train in order to obtain full compensation. Still referring to FIG. 11, it will be assumed for purposes of illustration that wave W1 has a peak intensity of 3 in some arbitrary units while the wave W2 has a peak intensity of 1 in the same units. The part of the square wave corresponding to peak intensity is referred to as the crest portion and the part of the square wave that is at zero intensity is referred herein as the trough portion.

Because if the Kerr effect, the propagation constant seen by the trough portion of a given wave will be different than the propagation constant seen by the crest portion of that same wave. In this particular example, the intensity of the wave at the trough portions is negligible and it will not contribute to the rotation rate error, so it may be ignored. Thus, in this example, only the propagation constant seen by the crest portions need be examined to determine the intensity weighted average phase shift of the waves.

The propagation constant of the crest portions of either of the waves W1, W2 will change, due to the Kerr effect, as the wave travels through successive crest and trough portions of the oncoming wave. For example, if one imagines an observer at an arbitrary reference point on the crest portion of the wave W1, as at point A in FIG. 11, traveling with the wave W1, the propagation constant seen by that observer will be at a first value when point A is within a crest portion of the oncoming wave W2, and will be at a second value when point A is within a trough portion of the oncoming wave W2. Since the duty cycle of the wave W2 is 50%, and the observer sees trough portions and crest portions of this wave an equal amount of time, the average propagation constant of the wave W1 (e.g., seen by the observer at point A) will simply be the average of the sum of these first and second values. The situation is similar for an observer traveling with the wave W2 on its crest portion, as at the reference point B in FIG. 11.

The propagation constant of the wave W2 (e.g., seen by the point B observer) will change between first and second values as it travels through successive crest and trough portions of the oncoming wave W1, i.e., the propagation constant will be at a first value when point B is within a crest portion of the wave W1 and at the second value when point B is within a trough portion of the wave W1. Since the wave W1 also has a 50% duty cycle, the average propagation constant of the wave W2 (e.g., the point B observer) is the average of the sum of these first and second values for the wave W1 may be different than those for the wave W2, however, if the Kerr effect is fully compensated, the average propagation constants for the wave W1 and W2 will be the same.

The average, Kerr-induced change in propagation constants for each of the waves W1, W2 will now be calculated for the example described above in reference to FIG. 11. For the wave W1, the Kerr-induced change in propagation constant ($\Delta\beta_1$) seen, e.g., at point A, when point A is within a crest of the oncoming wave W2, may be defined as:

$$\Delta\beta A_1 = k(I_1 + 2I_2) \qquad (13)$$

However, when point A is within a trough of the oncoming wave W2, the Kerr-induced change in propagation constant ($\beta_1$) seen by the wave W1 at point A is:

$$\Delta\beta_1 = k(I_1) \qquad (14)$$

where $I_1$ and $I_2$ are the intensities of the waves W1, W2, respectively. The constant k is included as a proportionality constant.

From equations (13) and (14), it may be seen that, as expected, when point A of the wave W1 is within a crest of the oncoming wave W2, there is both a self effect (due to W1) and a cross effect (due to W2), while, when point A is within a trough of the oncoming wave, there is only a self effect.

Substituting the appropriate values into equations (13) and (14), it may be seen that when point A is within a crest, the change in propagation constant is equal to 5k, and when it is within a trough, the change in refractive index is 3k. Thus, the average propagation constant of the wave W1 is equal to 4k.

For the wave W2, the change in propagation constant when point B is within a crest of the oncoming wave W1, may be defined as:

$$\Delta\beta_2 = k(I_2 + 2I_1) \qquad (15)$$

However, when point B of the wave W2 is within a trough of the oncoming wave W1, the change in propagation constant is:

$$\Delta\beta_2 = k(I_2) \qquad (16)$$

Inserting the appropriate intensity values into equation (15), the change in propagation constant, when point B is within a crest portion of the oncoming wave, is equal to 6K. Similarly, using equation (16), it may be found that the change in propagation constant, when point B is within a trough of the oncoming wave, is equal to 1k. Since the duty cycle is 50%, and the wave W2 has each propagation constant an equal amount of time, the average propagation constant is simply the average of 1k+7k, which is, again, 4k.

Therefore, even though the respective intensities of the waves W1, W2, in the above example, were quite different, the average change in the propagation constant for each of the waves was the same (e.g., 4k) over a complete period of square wave modulation. Using other intensities for the waves W1, W2 should yield the same results.

Waveform Intensity Requirements

The present invention is not limited solely to the type of square wave modulation discussed above. Other types of waveforms may be utilized. The waveform requirements are best illustrated mathematically, as discussed below.

The Kerr-induced rotation rate error $\Omega_k$, for the rotation sensor of the preferred embodiment, is a function of the intensity weighted average of the phase differences between the waves. Also, the detection system described above provides a signal proportional to the intensity weighted average of the nonreciprocal (Kerr-induced) phase shift. Accordingly, the Kerr-induced rotation rate error may be expressed mathematically as follows:

$$\Omega_k = \frac{c}{R}\eta n\delta(1-2K)\frac{<I_0^2(t)> - Q_i<I_0(t)^2>}{<I_0(t)>} \qquad (17)$$

where c is the velocity of light in a vacuum, R is the radius of the fiber coil, $\eta$ is the impedance of the medium, n is the Kerr coefficient of the medium, $\delta$ is a factor on the order of unity that depends upon the transverse distribution of the mode, K is the coupling ratio, $I_0(t)$ is the intensity of the modulated source wave as a function of time, and $Q_i$ is a constant, referred to herein as the "ideal waveform factor," having a value which provides complete Kerr compensation. The angle brackets indicate an average over time.

From equation (17) it may be seen that the Kerr-induced rotation rate error can be eliminated by utilizing a waveform which reduces the numerator of the quantity in brackets to zero. Such a waveform would satisfy the equation:

$$<I_0^2(t)> = Q_i <I_0(t)>^2 \qquad (18)$$

Thus, by modulating the applied laser light in accordance with a waveform that satisified equation (18), complete Kerr effect compensation may be achieved. This requires that the average value of the square of the waveform intensity be equal to the waveform factor $Q_i$ times the average value of the waveform intensity square. Although equation (18) is expressed in terms of the modulated source light, $I_0(t)$, it will be understood that this equation applies equally to each of the counterpropagating waves W1, W2, since the splitting coupler 34 does not affect the shape of the waves, but merely splits the source wave intensity to provide the two counterpropagating waves.

If it is assumed that the fiber comprising the loop 14 is lossless, the ideal waveform factor $Q_1$ should be equal to 2.0 for complete Kerr compensation. In this regard, it will be recalled that the term "ideal waveform factor" is defined as that waveform factor necessary to achieve complete Kerr compensation. If, however, rather than being lossless the fiber attenuates the waves to some extent, as do all present commercially available fibers, the ideal waveform factor will deviate from a value of 2.0, the amount of such deviation being a direct function of the amount of attenuation, and an inverse function of the modulation frequency.

The attenuation of a wave as it traverses the loop 14, from one end to the other, may be defined by the equation:

$$I_{in} = I_{out} e^{-2\alpha l} \tag{19}$$

where $I_{in}$ is the intensity of the wave at the beginning of the loop, $I_{out}$ is the intensity of the wave at the end of the loop, $\alpha$ is the amplitude attenuation coefficient, and $l$ is the length of the loop. The quantity, $\alpha l$, therefore, indicates the amplitude loss of the wave as it traverses the loop, while the quantity, $2\alpha l$, indicates the corresponding intensity loss.

The attenuation of the fiber, in the worst case situation, will cause the ideal waveform factor to deviate from 2.0 by an amount equal to $\frac{1}{3}\alpha^2 l^2$. This "worst case" situation assumes that the frequency of a square wave modulating waveform is such that its period is equal to twice the transit time of the loop, where the transit time of the loop is defined as the time required for a wave to traverse the loop. In general, as the period of the modulating waveform decreases (frequency increases), the deviation of the waveform factor from 2.0 will decrease. It is estimated that at frequencies above 5 MHz, the effect of attenuation upon the waveform factor becomes negligible. Thus, for other than lossless fibers, the ideal waveform factor $Q_i$ may be defined in terms of a maximum range as follows:

$$Q_i = 2 \pm \tfrac{1}{3}(\alpha^2 l^2) \tag{20}$$

Assuming, for example, that the fiber utilized attenuates the waves by, e.g., 5 dB as the traverse the loop, the amplitude loss, $\alpha l$, would be equal to:

$$\alpha l = 5 dB/20 \log_{10} e = 0.575 \tag{21}$$

Substituting the result of equation (21) into equation (20), it follows that the ideal waveform factor, for up to a 5 dB loss, will be between about 1.9 and 2.1, the exact value depending upon the amount of such loss. Thus, it may be seen that, even at very low frequencies and relatively high attenuation, the fiber losses do not greatly affect the ideal waveform factor. In practice, it is probably most convenient to select a waveform having a waveform factor of 2.0 and empirically adjust a waveform parameter, such as a duty cycle, frequency or amplitude, until long-term drift of the interferometer is minimized to compensate for the effects of fiber losses.

Thus, by modulating the counterpropagating waves in accordance with a waveform which satisfied equation (18), complete Kerr compensation may be provided. Significantly, such Kerr compensation is independent of the polarization of the lightwaves.

Referring back to equation (17), it may be seen that nonreciprocal operation caused by the Kerr effect may be eliminated, at least theoretically, by adjusting the coupler 34 so that the splitting ratio is 0.5 and the waves W1, W2 are equal in intensity. However, to achieve sufficient Kerr compensation for inertial navigation applications requiring an accuracy of 0.001 deg/h, it is estimated that the splitting ratio of the coupler 34 would need to be adjusted within a tolerance on the order of magnitude of $0.5 \pm 10^{-4}$, assuming a cw source. In practice, it appears that this is not possible or, at least, impractical, even under laboratory conditions. It is believed that the best achievable tolerance, under laboratory conditions, would be no more than about $0.5 \pm 10^{-3}$, which would not provide sufficient Kerr compensation for many applications. Moreover, maintaining such a tolerance would be very difficult, particularly in commercial applications where the interferometer is subjected to vibration or other physical disturbances, as in aircraft gyroscopes.

In contrast, modulating the intensity of the waves in accordance with a waveform satisfying equation (18) causes the Kerr effect to be compensated, regardless of the splitting ratio of the coupler 34. Tests were conducted, utilizing the modulation technique of the present invention, with splitting ratios of 0.75, 0.50 and 0.25. The rotation rate error remained substantially constant for all splitting ratios, which indicates that the rotation rate error is independent of the splitting ratio. However, when the modulation technique was not used, the rotation rate error was substantially higher at splitting ratios of 0.75 and 0.25 than at 0.50. Nevertheless, in some situations (discussed below), it may be advantageous to adjust he coupler 34 to a splitting ratio which is as close as possible to 0.5, so that some of the Kerr compensation can be provided through coupler adjustment, while the remainder is provided by modulating the applied light according to the present invention.

As indicated previously, for inertial navigation applications, an error rate of up to $10^{-3}$ deg/h is typically acceptable. Therefore, in such applications, it is not essential that the Kerr compensation be perfect, and thus, the waveform factor, discussed in reference to equation (18), need not be "ideal". The term "acceptable waveform factor," $Q_a$, will b used herein to refer to that waveform factor which satisfies an inertial navigation error rate standard of $10^{-3}$ deg/h. The required tolerance for the acceptable waveform factor depends, of course, upon the acceptable error rate, but also depends upon how close the splitting ratio of the coupler 34 is to 0.5. In other words, there is a relationship between the tolerance of the waveform factor and the splitting ratio of the coupler such that it is preferable to adjust the coupler 34 splitting ratio as nearly as practical to 0.5. This permits some of the Kerr effect compensation to be provided through coupler adjustment, while the remaining compensation can be provided by means of the modulation technique of the present invention. To examine the relationship between these tolerances for inertial navigation accuracies (requiring an error free rate of less than $10^{-3}$ deg/h), it is helpful to rewrite equation (17) as:

$$\frac{\Omega_k}{<I_0(t)>} = \frac{c}{R} \eta n \delta (1 - 2K) \frac{<I_0^2(t)>}{<i_0(t)>^2} - Q_i \tag{22}$$

Equation (22) may be simplified by substituting the following representative order of magnitude values:

$c/R = 10^{10}$ sec$^{-1}$; $= I_0(t) > = 1\mu W/\mu m^2$; $\eta n \delta = 10^{14}$ $\mu m^2/\mu W$ Using these values and substituting the maximum error appropriate for inertial navigation for $\Omega_K$, i.e., $10^{-3}$ deg/h, or about $10^{-8}$ sec$^{-1}$, equation (22) reduces to:

$$(1 - 2K) \frac{<I_0^2(t)>}{<I_0(t)>^2} - Q_i = 10^{-4} \tag{23}$$

If the splitting ratio K of the coupler 34 is adjusted such that $K = 0.5 \pm 10^{-3}$, which is believed to be the best achievable tolerance under laboratory conditions, equation (23) reduces to:

$$\frac{<I_0^2(t)>}{<I_0(t)>^2} - Q_i = 10^{-1} \tag{24}$$

From equation (24) it will be seen that, for inertial navigation accuracies, the average of the intensity squared divided by the square of the average intensity should be equal to the ideal waveform factor, $Q_i \pm 10^{-1}$. That is:

$$<I_0^2(t)>/<I_0(t)>^2 = Q_i \pm 10^{-1} = Q_a \tag{25}$$

Thus, the acceptable waveform factor is equal to the ideal waveform factor $\pm 10^{-1}$. Equation (25) may be rewritten in the following form, corresponding to equation (18):

$$<I_0^2(t)> = (Q_i \pm 0.1)<I_0(t)>^2 \tag{26}$$

Substituting equation (20) into equation (26) yields a range for $Q_a$ of:

$$Q_a = 2 \pm \frac{1}{2}(\alpha^2 l^2) \pm 0.1 \tag{27}$$

Thus, for the previously-described example, where $\alpha l$ was assumed to be no more than 5 dB and the corresponding "ideal waveform factor" range was 1.9 to 2.1, the corresponding "acceptable waveform factor" range for inertial navigation accuracies would be 1.8 to 2.2. It will be recognized that this waveform factor range (i.e., 1.8 to 2.2) is necessarily an approximation, based on "order of magnitude" values, for a representative fiber and laser, and that the range may vary slightly, depending on the characteristics of the particular fiber and laser used. However, based upon these representative values, it is estimated that, regardless of the fiber type and laser, the acceptable waveform factor for inertial navigation accuracies of $10^{-3}$ deg/h should be within a range of 1.6 to 2.4.

The foregoing discussion, in general, and equation (18) in particular, is based in the assumption that the average value of the intensity of the modulated wave, i.e., $<I_0(t)>$ is equal to the average intensity $I_{0(t)}$ over a time period equal to $2\tau$, where $\tau$ is the transit time of the fiber loop 14 (i.e., the time required for a wave to traverse the loop). This requirement is satisfied, for example, where the modulation frequency is such that the period of the waveform times an integer is equal to the transit time of the loop. For situations where this requirement is not satisified, the modulating waveform should be chosen according to the following, more general, version of equation (18):

$$\frac{1}{T} \int_{-T/2}^{T/2} I_0^2(t) dt = \tag{28}$$

$$\frac{Q}{T} \int_{-T/2}^{T/2} dt \left[ \frac{I_0(t)}{2\tau} \int_{t-\tau}^{t+\tau} I_0(t') dt' \right]$$

where:

T is the integration time of the detection system (e.g., 1 hour);

$\tau$ is the transit time required for a wave to traverse the loop 14 (e.g., 3 microseconds);

$I_0(t)$ is the intensity of the intensity modulated wave as a function of time;

$I_0(t')$ is the intensity of the intensity modulated wave at an arbitrary time t', where t' is between $t - \tau$ and $t + \tau$; and q is the waveform factor (a constant) which may, for example, be equal to either the ideal waveform factor, $Q_i$, or the acceptable waveform factor, $Q_a$, depending upon whether the waveform is selected to provide complete Kerr compensation or whether the waveform is selected to provide compensation for inertial navigation purposes; illustrative respective values, including ranges, for these waveform factors, $Q_i$, $Q_a$, were provided in the discussion above.

In general, equation (28) will provide more precise results than equation (18). However, the difference in results between equations (18) and (28) decreases with increasing frequency of modulation. For example, for moderately high frequencies, e.g., greater than 10 MHz, equation (18) should provide substantially the same results as equation (28). Therefore, it is preferable to utilize the more complex equation (28) when the modulating frequency selected is relatively low (below 10 MHz), and where the average intensity of the modulated wave (over an infinite or relatively long period) does not equal the average intensity over a period equal to twice the transit time of the loop. However, the modulating frequency, in any case, should be different than those of the phase modulators.

Kerr Compensation with Thermal Sources

A large class of light sources 16 provide the intensity variations required to compensate for Kerr effect-induced errors in rotation sensors. As set forth below, thermal sources provide a waveform factor of 2, and thus, produce an intensity modulated waveform suitable for Kerr compensation. From equations (17), (18) and (28), the relation between the rotation rate error $\Omega_k$ and the source intensity, I(t), for a waveform factor of 2, may be expressed as:

$$\Omega_k \alpha <I^2(t)>_{t2} > I(t)<I(t)>_{2\tau} >_T \tag{29}$$

where the angled brackets indicate time averaging over time intervals T or $2\tau$, as indicated by the subscripts, where T is the detection system integration time and $\tau$ is the transit time of light around the fiber loop 14. Assuming that the average intensity is established over a time $2\tau$, equation (29) becomes:

$$\Omega_k \alpha <I^2(t)> - 2<I(t)>^2 \tag{30}$$

In the following, it is assumed that I(t) is a stochastic process varying randomly with time; that the average value of I(t) is constant with respect to time; and that I(t) is ergodic so that the occurrence of any particular value is equally likely. By defining I = I(t) and identifying the variance permits equation (30) to be written as:

$$\sigma_I^2 = \overline{I^2} - \overline{I}^2 \tag{31}$$

where the bar over a quantity indicates an ensemble average or mean value.

$$\Omega_k \alpha \sigma_I^2 - I^2 \quad (32)$$

which shows that the rotation rate error induced by the Kerr effect vanishes if the standard deviation, $\sigma_I$, is equal to the mean value, I, of the intensity. Polarized thermal light, such as is output by a superluminescent diode, satisfies the condition that $\sigma_I = I$. Therefore, polarized thermal light may be used to provide a rotation sensor which is insensitive to the Sagnac effect.

By virtue of the central limit theorem, which is a well-known mathematical relationship, the amplitude of polarized thermal light is a circular complex Gaussian random process. The corresponding intensity is a random process with an exponential probability density defined by:

$$p(I) = \begin{cases} \frac{1}{I} \exp -\frac{I}{I} & I \geq 0 \\ 0 & I < 0 \end{cases} \quad (33)$$

The second moment of the intensity of polarized thermal light is:

$$I^2 = \int_0^\infty \frac{I^2}{I} \exp\left(\frac{-I}{I}\right) dI \quad (34)$$

which after integration by parts becomes:

$$I^2 = 2I^2 \quad (35)$$

Therefore, referring to equation (30), when polarized thermal light is used in the rotation sensing device described herein, the Kerr effect produces no error in the sensed rotation rate.

Kerr Compensation with Multimode Source

Laser light comprising a number of oscillatory modes, or frequencies, i.e., multimode lasers, may also be used in the rotation sensing device described herein to provide a lower rotation rate error than is possible with unmodulated light of a single frequency.

It is assumed that the laser cavity (not shown) is dispersive such that the laser oscillatory modes are not evenly spaced in frequency as is the case with diode lasers. The light amplitude in the dispersive case is the sum of the contributions of the individual modes and may be expressed as:

$$A(t) = \sum_{n=1}^{N} A_n e^{i f(n) \omega t} \quad (36)$$

where $A_n$ and $f(n)\omega$ are the complex amplitude and frequency, respectively of the $n^{th}$ oscillating mode; and N is the number of modes or frequencies at which the cavity oscillates. A similar result is obtained without dispersion if the phases of each of the modes are random and statistically independent. Neglecting the finite line width of the individual modes and expanding $f(n)$ in a Taylor series gives:

$$A(t) = \sum_{n=1}^{N} A_n e^{i(\omega + n\Delta\omega + n^2\delta\omega + \ldots)t} \quad (37)$$

The corresponding intensity is:

$$I(t) = A(t)A^*(t) = \sum_{n,m=1}^{N} A_n A_m e^{i[(n-m)\Delta\omega + (n^2 - m^2)\delta\omega + \ldots]t} \quad (38)$$

The average intensity is the sum of the averages of the individual terms. The averages of the exponentials are zero unless $n = m$, which yields:

$$<I(t)> = \sum_{n=1}^{N} |A_n|^2 \quad (39)$$

The square of the intensity is:

$$I^2(t) = \sum_{n,m,l,k=1}^{N} A_n A_m A_l A_k e^{i[(n-m+l-k)\Delta\omega + (n^2 - m^2 + l^2 - k^2)\delta\omega + \ldots]t} \quad (40)$$

The time average of the exponentials is zero unless $n - m + l - k = 0$ and $n^2 - m^2 - l^2 - k^2 = 0$. For the possibility that $n = m$, it is required that $l = k$ in order that $I(t) \propto 0$. If $n \neq m$, then it is required that $n = k$ and $m = l$ in order that $I(t) \neq 0$. The foregoing restrictions on n, m, l and k cause all the terms in the exponent of equation (40) to vanish, giving:

$$<I^2(t)> = \sum_{n,l=1}^{N} |A_n|^2 |A_l|^2 + \sum_{n,m=1}^{N} |A_n|^2 |A_m|^2 - \sum_{n=1}^{N} |A_n|^4 \quad (41)$$

which may be expressed as:

$$<I^2(t)> = 2 <I(t)>^2 - \sum_{n=1}^{N} |A_n|^4 \quad (42)$$

The foregoing assumes amplitudes which are constant with respect to time. In order to account for the finite times over which the time averaged values were determined in applying equation (42), it is sufficient that $2\Phi\{\tau\} >> 1$ and $\phi\{T\} >> 1$, which are not overly restrictive since $\tau$ is on the order of microseconds, and T is on the order of seconds.

Consideration of the case of N equal amplitude modes such that $$|A_n|^2 = (1/N)|A|^2 \quad (43)$$

yields:

$$\Omega_k \alpha \frac{<I^2(t)> - 2<I(t)>^2}{<I(t)>^2} = -\frac{1}{N} \quad (44)$$

which shows that the Kerr-induced rotation rate error is inversely proportional to the number of oscillating modes of the laser.

Experimental Results

A working model of the rotation sensor described herein employed a GaAs laser diode as the light source 16. This particular laser diode has more than 50 oscillating modes and 10 oscillating modes within the full width of the half maximum power points of the laser output spectrum. The light source 16 inserted an average of about 120 microwatts of power into the fiber 12 and about 10 microwatts were received by the detector 30.

The relative amounts of power of the counterpropagating waves in the loop 14 were adjusted by tuning the coupling ratio K of the coupler 34. If the intensity of the counterpropagating waves were constant in time, the rotation sensor would suffer a rotation rate error due to the optical Kerr effect of up to approximately 10 degrees per hour. No such error was observed within the limits of accuracy of the measurements when the multimode laser described hereinabove was used as the light source 16. Within the experimental accuracy, the fluctuating intensity light source 16 produced a Kerr induced rotation rate error which was less than 1% of the predicted error for a constant intensity source.

Adjustment of the polarization controller 36 to vary the polarization of the counter propagating waves did not produce a Kerr induced rotation rate error, which is in agreement with theoretical predictions that Kerr effect compensation using the apparatus and methods of the present invention is independent of polarization.

Figure 12:
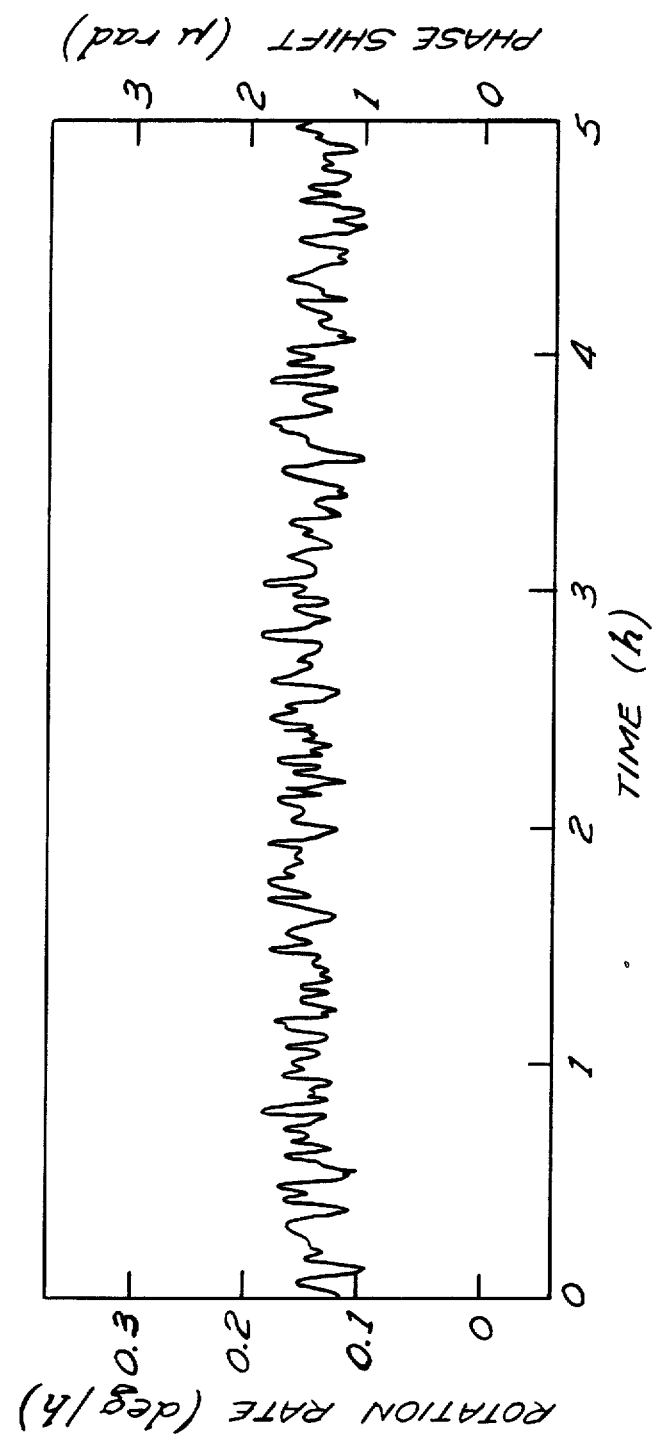
FIG. 12 is a graph representing experimental results obtained.

FIG. 12 illustrates the rotation signal from the rotation sensing device of the invention for a five hour period. FIG. 12 illustrates that the present invention provides a substantial improvement in the long-term stability of fiber optics rotation sensing systems. The offset of just over 0.1 deg/h, which is about 1% of the earth's rotation rate, as measured by turning off the light source 10 may reflect inaccuracy in the orientation of the axis of the coil 14, which should be perpendicular to the earth's axis of rotation. The curve exhibits an RMS short-term noise value of 0.02 deg/h, which is due to the electronics of the system.

If the light source 10 does not provide an output having a sufficient number of oscillatory modes to produce satisfactory Kerr effect compensation, a modulator 11 may be included between the light source 10 and the lens 15. Ordinarily the modulator 11 will modulate the output of the light source 10 so that counter propagating light waves having 50% duty cycles are coupled into the loop 14.

For example, if the light source 10 outputs two frequencies which beat together to have a duty cycle of 67%, the modulator 11 provides modulation to reduce the duty cycle to 50%. Such modulation may be provided by square wave modulation of the output of the light source 10.

What is claimed is:

1. A fiber optic ring interferometer, having Kerr effect compensation, comprising:
    a light source;
    a loop of fiber optic material;
    means for coupling light from said source to said loop, said coupling means splitting said light from said source into first and second waves which counterpropagate through said loop, and combining said waves after propagation through said loop to form an output signal, the intensity of said waves being sufficiently high to cause the electric fields of said counterpropagating waves to alter the propagation constant of said fiber optic material in accordance with the Kerr effect to produce a self effect and a cross effect for each of said waves, the relative intensity of said waves being unequal to cause the self effect and cross effect of said first wave to be different than the self effect and cross effect, respectively, of said second wave; and
    means for intensity modulating light produced by said light source to cause said counterpropagating waves to be modulated in accordance with a waveform selected to reduce differences in the average propagation constants for said waves caused by the Kerr effect, the average value of the square of the waveform intensity equal to a constant times the average value of the waveform intensity squared, said constant having a value between 1.6 and 2.4.

2. A fiber optic ring interferometer, as defined by claim 1, wherein said constant has a value between 1.8 and 2.2.

3. A fiber optic ring interferometer, as defined by claim 1, wherein said constant has a value between $1.9 - \frac{1}{3}\alpha^2 l^2$ and $2.1 - \frac{1}{3}\alpha^2 l^2$, where $\alpha$ is the amplitude attenuation coefficient of said fiber optic material, and l is the length of the fiber loop.

4. A fiber optic ring interferometer, as defined by claim 1, wherein said waveform is a square wave.

5. A fiber optic ring interferometer, as defined by claim 4, wherein the duty cycle of said square wave is 50%.

6. A fiber optic ring interferometer, as defined by claim 1, wherein the normalized intensity of one of said counterpropagating waves is greater than that of the other counterpropagating waves by at least $2 \times 10^{-3}$.

7. A fiber optic ring interferometer, as defined by claim 1, wherein the sum of the maximum intensities of said counterpropagating waves is at least 1 watt per square centimeter.

8. A fiber optic ring interferometer, as defined by claim 1, wherein the frequency of said waveform is at least 10 MHz.

9. A fiber optic ring interferometer, as defined by claim 1, wherein for each of said modulated waves, the average intensity over an infinite time period is equal to the average intensity over a time period equal to twice the transit time of the loop.

10. A fiber optic ring interferometer, having Kerr effect compensation, comprising:
    a light source means;
    a loop of fiber optic material;
    means for coupling light from said light source means to said loop, said coupling means splitting said light from said source into first and second waves which counterpropagate through said loop, and combining said waves after propagation through said loop to form an output signal, said waves of sufficiently high intensity such that the electric fields of said counterpropagating waves alter the propagation constant of said fiber optic material, in accordance with the Kerr effect to produce a self effect and a cross effect for each of said waves, the intensity of said waves being unequal to cause the self effect and cross effect of the first wave to be different than the self effect and cross effect, respectively, of the second wave; and
    said light source means including means for intensity modulating said counterpropagating waves in accordance with a waveform selected to reduce the difference between the intensity weighted averages of the propagation constants for said counterpropagating waves.

11. A fiber optic ring interferometer, as defined by claim 10, additionally comprising a detection system for detecting the phase difference between said counterpropagating waves after they have traversed said loop, and wherein said waveform satisfies the equation:

$$\frac{1}{T} \int_{-T/2}^{T/2} I_0^2(t)dt = \frac{Q}{T} \int_{-T/2}^{T/2} dt \left[ \frac{I_0(t)}{2\tau} \int_{t-\tau}^{t+\tau} I_0(t')dt' \right]$$

where:

T is the integration time of the detection system;

$\tau$ is the transit time required for a wave to traverse the loop;

$I_0(t)$ is the intensity of the modulated source light as a function of time;

$I_0(t')$ is the intensity of the modulated source light at an arbitrary time t', where t' is between $t+\tau$ and $t-\tau$; and Q is a constant, between 1.6 and 2.4.

12. A fiber optic ring interferometer, as defined by claim 11, wherein the frequency of said waveform is less than 10 MHz.

13. A fiber optic ring interferometer, as defined by claim 10, wherein said Kerr compensation provided by said waveform is independent of the polarization of said counterpropagating waves.

14. A method of operating a fiber optic ring interferometer, which has a light source, optically coupled to apply counterpropagating lightwaves to a loop of fiber optic material, said method comprising:
applying said counterpropagating lightwaves to said loop with sufficiently unequal intensity and sufficiently high combined intensity to alter the propagation constant of said fiber during counterpropagation of said lightwaves through said loop, and cause a Kerr-induced phase difference between said waves; and
intensity modulating at least one of the counterpropagating lightwaves applied to said loop with a waveform which reduces said Kerr-induced phase difference and thereby provide Kerr effect compensation.

15. A method of operating a fiber optic ring interferometer, as defined by claim 14, wherein said modulation is a square wave.

16. A method of operating a fiber optic ring interferometer, as defined by claim 14, wherein said modulation causes the intensity of said counterpropagating waves to vary such that the average value of the square of the intensity is equal to a constant times the average value of the intensity squared, said constant having a value between 1.6 and 2.4.

17. A method of reducing errors caused by the AC Kerr effect in a fiber optic ring interferometer, which has a light source, optically coupled to apply counterpropagating lightwaves of unequal average intensity to a loop of fiber optic material, the intensity of said waves sufficiently high to alter the propagation constant of said fiber optic material in accordance with the Kerr effect, said method comprising applying each of the counterpropagating waves to said loop such that the average value of the square of the intensity is equal to a constant times the average value of the intensity squared, said constant having a value between $2+\frac{1}{3}\alpha^{2l^2}$ and $2-\frac{1}{3}\alpha^{2l^2}$, where $\alpha$ is the amplitude attenuation coefficient of the fiber optic material, and l is the length of the fiber loop.

18. A method of reducing errors caused by the AC Kerr effect in a fiber optic ring interferometer, which has a light source optically coupled to apply counterpropagating lightwaves of unequal average intensity to a loop of fiber optic material, said method comprising:
utilizing said light source to produce light having an intensity corresponding to a predetermined waveform; and
modifying said predetermined waveform to cause the intensity of said counterpropagating waves to correspond to a modified waveform which reduces said errors caused by the Kerr effect in said interferometer.

19. A method of reducing errors caused by the AC Kerr effect in a fiber optic ring interferometer, which has a light source, optically coupled to apply counterpropagating lightwaves of unequal intensity to a loop of fiber optic material, said counterpropagating waves being of sufficiently high combined intensity to alter the refractive indices of said fiber in accordance with the Kerr effect, said method comprising intensity modulating at least one of said counterpropagating waves in accordance with a waveform selected to cause the respect average refractive indices experienced by said counterpropagating waves during traverse of said loop to be substantially the same.

20. A method of reducing errors caused by the Kerr effect in a fiber optic ring interferometer, as defined by claim 19, wherein the sum of the maximum intensities of said counterpropagating lightwaves is greater than 1 watt per square centimeter.

21. A method of reducing errors caused by the Kerr effect in a fiber optic ring interferometer, as defined by claim 19, wherein the frequency of said intensity modulation is at last 5 MHz.

22. A method of reducing errors caused by the Kerr effect in a fiber optic ring interferometer, as defined by claim 19, wherein the frequency of said modulation is such that the average wave intensity over an infinite time period is equal to the average intensity over a time period equal to twice the transit time of the loop.

23. A fiber optic ring interferometer, as defined by claim 1, wherein said modulating means comprises a modulator which modulates the light produced by said light source in response to a signal.

24. A fiber optic ring interferometer, as defined by claim 10, wherein the ratio of the intensity of one of said waves to the intensity of the other of said waves is less than 0.499 or greater than 0.501, and wherein said modulating means causes each of said counterpropagating lightwaves to have a waveform such that the average value of the square of the waveform intensity is equal to a constant times the average value of the waveform intensity squared, said constant having a value between 1.6 and 2.4.

25. A method of reducing errors caused by the AC Kerr effect, as defined by claim 18, wherein said waveform is modified by adjusting the duty cycle.

26. A fiber optic ring interferometer, comprising:
light source means for producing a lightwave having an intensity corresponding to a first waveform;
a loop of fiber optic material;
means for coupling said lightwave to said loop of fiber optic material to provide a pair of counterpropagating lightwaves of unequal average intensity in said loop, said coupling means combining said lightwaves after propagation through said loop to provide an optical output signal, said optical output signal having a non-rotationally-induced phase error caused by the Kerr effect when the intensities of said counterpropagating waves correspond to said first waveform; and means for modifying said first waveform to cause at least one of said counterpropagating waves to have an intensity corresponding to a second waveform such that said non-rotationally-induced phase error caused by the Kerr effect is reduced.

27. A fiber optic ring interferometer, as defined by claim 26, wherein for said second waveform, the average value of the square of the waveform intensity is equal to a constant times the average value of the waveform intensity squared, said constant having a value between 1.6 and 2.4.

28. A fiber optic ring interferometer, as defined by claim 26, wherein for said second waveform, the average value of the square of the intensity is equal to a constant times the average value of the waveform intensity squared, said constant being between $2+\frac{1}{3}\alpha^2 l^2$ and $2-\frac{1}{3}\alpha^2 l^2$, where $\alpha$ is the amplitude attenuation coefficient of the fiber optic material, and l is the length of the loop.

29. A fiber optic ring interferometer, as defined by claim 26, wherein said coupling means comprises a fiber optic directional coupler.

30. A fiber optic ring interferometer, as defined by claim 26, wherein said modifying means comprises a modulator for intensity modulating light having said first waveform.

31. A fiber optic ring interferometer, comprising:
light source means for producing light;
a loop of fiber optic material;
means for coupling said light to said loop and for splitting said light into first and second lightwaves which counterpropagate through said loop, said coupling means having a splitting ratio which is less than 0.499 or greater than 0.501 to cause said lightwaves to have unequal intensities which alter the propagation velocity of said lightwaves in accordance with the Kerr effect; and
said light source means including means for intensity modulating at least one of said counterpropagating waves in accordance with a waveform which reduces errors caused by the Kerr effect.

32. A fiber optic ring interferometer, as defined by claim 30, wherein for each of said counterpropagating waves, the average value of the square of the intensity is equal to a constant times the average value of the intensity squared, said constant having a value between 1.6 and 2.4.

33. A fiber optic ring interferometer, as defined by claim 30, wherein for said second waveform, the average value of the square of the intensity is equal to a constant times the average value of the waveform intensity squared, said constant being between $2+\frac{1}{3}\alpha^2 l^2$ and $2-\frac{1}{3}\alpha^2 l^2$, where $\alpha$ is the amplitude attenuation coefficient of the fiber optic material, and l is the length of the loop.

34. A fiber optic interferometer, as defined by claim 33, wherein said interferometer comprises a rotation sensor, the error rate of said rotation sensor being no greater than 0.001 degrees per hour.

35. A fiber optic ring interferometer, as defined by claim 1, wherein the coupling means has a coupling ratio which is substantially different than 0.5 to cause the intensities of said waves to be substantially unequal.

36. A fiber optic interferometer, with Kerr effect-induced error comprising:

a loop of fiber optic material, said fiber optic material having a predetermined index of refraction;

means for coupling a first lightwave and a second lightwave into said loop for propagation in opposite directions in said loop, each of said first and second lightwaves having a sufficiently high electric field associated therewith to produce a variation in the index of refraction, and thus, a variation in accordance with the Kerr effect, said coupling means causing said waves to have unequal intensities such that the self effect and the cross effect of one of said waves is different than the self effect and cross effect of the other of said waves; and a light source connected to said coupling means for generating said first and second lighwaves, said light source providing light having a plurality of frequencies to said coupler means, said plurality of frequencies combining to produce a light intensity which varies with time to produce an intensity modulation such that the average value of the square of the intensity is substantially equal to twice the average value of the intensity squared, thereby reducing differences in the average propagation constants for said waves.

37. A fiber optic interferometer, as defined by claim 36, wherein said plurality of frequencies combine to produce a light intensity having a duty cycle of 50%.

38. A fiber optic interferometer, as defined in claim 36, additionally comprising means for modulating the light intensity from said light source, said modulating means cooperating with the variations in said light intensity produced by said plurality of frequencies to further reduce said differences in the average propagation constants for said waves.

39. A fiber optic interferometer, as defined in claim 38, wherein said modulating means is disposed to receive light from said light source.

40. A fiber optic interferometer, as defined in claim 36, wherein said fiber optic material is single mode for said plurality of frequencies of said light source.

41. A method for reducing the Kerr effect-induced error in a fiber optic ring interferometer, comprising the steps of:
selecting a light source having a sufficient number of frequencies to produce intensity modulated light in which the average value of the square of the intensity is substantially equal to twice the average value of the intensity squared to yield a duty cycle selected to compensate for Kerr effect-induced errors;
coupling light from said source into the interferometer such that two counterpropagating waves having unequal intensities travel therethrough;
combining the counterpropagating waves to produce an interference pattern; and
detecting intensity variations in the interference pattern.

42. An interferometer having reduced Kerr effect-induced errors, comprising:
a loop of optical fiber;
a light source selected to produce plural frequencies which interfere with one another to modulate the intensity of light from said light source, said light having a sufficiently high intensity to alter the propagation constant of said optical fiber in accordance with the Kerr effect;
a coupler connecting said light source to said loop, said coupler coupling a first fraction of the light from said source to circulate in said loop in a first direction and a second fraction of said light to circulate in the other direction, said first fraction less than 0.499 and said second fraction greater than 0.501, said coupler further combining said first and second fractions, subsequent to their circulation in said loop to provide an interference pattern, said modulation causing the average value of the square of the intensity to substantially equal twice the average value of the intensity squared, thereby reducing the Kerr effect-induced error in said interference pattern; and means for detecting said interference pattern.

43. An interferometer, as defined in claim 42, wherein said light source is a thermal source.

44. An interferometer, as defined in claim 42, wherein said light source comprises a multimode source having a deterministic phase relationship between said modes.

45. An interferometer, as defined in claim 41, wherein said light source comprises a multimode light source having a random phase relationship between said modes.

46. An interferometer, as defined by claim 42, wherein said interferometer comprises a rotation sensor, the error rate of said rotation sensor being no greater than 0.001 degrees per hour.

47. A fiber optic interferometer, as defined in claim 36, wherein the coupling means has a coupling ratio which is less than 0.499 or greater than 0.501 to cause said waves to have said unequal intensities.

48. A fiber optic interferometer, as defined by claim 36, wherein the coupling means has a coupling ratio which is substantially different than 0.5 to cause the intensities of said waves to be substantially unequal.

* * * * *